US010089610B2

(12) United States Patent
Chow et al.

(10) Patent No.: US 10,089,610 B2
(45) Date of Patent: Oct. 2, 2018

(54) AUTOMATIC PROVISIONING OF SERVICES TO NETWORK-CONNECTED DEVICES

(71) Applicant: The Toronto-Dominion Bank, Toronto (CA)

(72) Inventors: Arthur Carroll Chow, Toronto (CA); Paul Mon-Wah Chan, Markham (CA); Perry Aaron Jones Haldenby, Toronto (CA); Rakesh Thomas Jethwa, Toronto (CA); Eddie Cheuk Long Law, Toronto (CA); John Jong Suk Lee, Waterloo (CA); Stephen John McCann, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 129 days.

(21) Appl. No.: 15/275,657

(22) Filed: Sep. 26, 2016

(65) Prior Publication Data

US 2018/0091506 A1   Mar. 29, 2018

(51) Int. Cl.
| | |
|---|---|
| *H04L 29/06* | (2006.01) |
| *G06F 17/30* | (2006.01) |
| *G06F 15/16* | (2006.01) |
| *G06F 7/04* | (2006.01) |
| *G06Q 20/10* | (2012.01) |

(Continued)

(52) U.S. Cl.
CPC ....... *G06Q 20/102* (2013.01); *H04L 41/0806* (2013.01); *H04L 67/16* (2013.01); *H04L 67/2838* (2013.01)

(58) Field of Classification Search
CPC . H04L 63/0876; H04L 41/0806; H04L 67/16; H04L 67/2838; G06Q 20/102

USPC .............................................................. 726/6
See application file for complete search history.

(56) References Cited

U.S. PATENT DOCUMENTS

| | | | |
|---|---|---|---|
| 7,103,313 | B2 | 9/2006 | Heinonen et al. |
| 7,239,877 | B2 | 7/2007 | Corneille et al. |

(Continued)

FOREIGN PATENT DOCUMENTS

| | | |
|---|---|---|
| WO | WO-2015/031779 | 3/2015 |
| WO | WO-2015/193849 | 12/2015 |
| WO | WO-2016/014642 | 1/2016 |

OTHER PUBLICATIONS

Stefan Nastic; Provisioning Software-defined IoT Cloud Systems; IEEE—2014; p. 288-295.*

(Continued)

*Primary Examiner* — Monjur Rahim
(74) *Attorney, Agent, or Firm* — Duane Morris LLP

(57) ABSTRACT

The disclosed embodiments include computerized methods and systems that automatically provision one or more services available to an Internet-of-Things (IoT) devices upon connection to and registration onto communications network. In one aspect, a device may receive, from a computing system, data specifying one or more first services provisioned to the device. The device may identify a subset of the first services that are consistent with a device type of an additional device, and may transmit a portion of the stored first data that specifies the subset of the first services to that additional device. The additional device may process the transmitted portion to provision the subset of the first services to the additional device prior to a successful authentication.

20 Claims, 9 Drawing Sheets

(51) Int. Cl.
  *H04L 29/08* (2006.01)
  *H04L 12/24* (2006.01)

(56) References Cited

U.S. PATENT DOCUMENTS

| | | | | |
|---|---|---|---|---|
| 8,154,741 | B2* | 4/2012 | Furst | G06Q 10/0875 |
| | | | | 358/1.15 |
| 8,879,416 | B2 | 11/2014 | Mishra et al. | |
| 8,923,257 | B2 | 12/2014 | Montemurro et al. | |
| 9,288,273 | B2 | 3/2016 | Cherian | |
| 9,781,696 | B1* | 10/2017 | Soave | H04W 60/04 |
| 2015/0156266 | A1* | 6/2015 | Gupta | H04W 4/70 |
| | | | | 709/224 |
| 2015/0222621 | A1* | 8/2015 | Baum | H04W 4/70 |
| | | | | 726/9 |
| 2015/0327052 | A1 | 11/2015 | Ghai | |
| 2015/0350820 | A1 | 12/2015 | Son et al. | |
| 2016/0006837 | A1 | 1/2016 | Reynolds et al. | |
| 2016/0021500 | A1 | 1/2016 | Wok | |
| 2016/0037340 | A1 | 2/2016 | Rayment et al. | |
| 2016/0044001 | A1 | 2/2016 | Pogorelik et al. | |
| 2016/0080486 | A1 | 3/2016 | Ram et al. | |
| 2016/0156614 | A1* | 6/2016 | Jain | H04L 63/0876 |
| | | | | 726/6 |
| 2016/0248746 | A1* | 8/2016 | James | H04W 4/70 |
| 2016/0323689 | A1* | 11/2016 | Goluboff | H04L 63/0823 |
| 2016/0335731 | A1* | 11/2016 | Hall | G06Q 50/163 |
| 2016/0337181 | A1* | 11/2016 | Cathrow | H04L 41/0806 |
| 2016/0366141 | A1* | 12/2016 | Smith | H04L 63/062 |
| 2017/0006116 | A1* | 1/2017 | Kelly | H04L 41/04 |
| 2017/0093700 | A1* | 3/2017 | Gilley | H04L 45/44 |
| 2017/0346848 | A1* | 11/2017 | Smith | H04W 4/70 |

OTHER PUBLICATIONS

"Device Provisioning Concepts," IBM MobileFirst Foundation Developer Center, retrieved from https://mobilefirstplatform.ibmcloud.com/tutorials/en/foundation/6.3/authentication-security/device-provisioning-concepts/ on Sep. 26, 2016 (6 pages).

"IoT Solutions," retrieved from http://internet-of-things-innovation.com/iot-solutions/ on Sep. 26, 2016 (6 pages).

Perez, "Get started with Azure IoT Hub device management using C#," Aug. 11, 2016 (12 pages).

Cassar et al., "A Hybrid Semantic Matchmaker for IoT Services," 2012 (7 pages).

* cited by examiner

AUTOMATIC PROVISIONING OF SERVICES TO NETWORK-CONNECTED DEVICES

TECHNICAL FIELD

The disclosed embodiments generally relate to computer-implemented systems and processes that provision software-based services to network-connected devices.

BACKGROUND

Today, Internet-of-Things (IoT) devices are common throughout our homes, vehicles, and places of business. The operation of these IoT devices may depend on an effective and efficient provisioning of services, despite the discrepancies between the various processing, storage, and communications capabilities that characterize modern IoT devices.

SUMMARY

The disclosed embodiments include computer-implemented systems and methods that automatically provision one or more services available to an Internet-of-Things (IoT) devices upon connection to and registration onto communications network.

In one aspect, a device may include a communications module, a storage unit storing instructions, and at least one processor being coupled to the communications module and the storage unit and configured to execute the instructions to establish a connection with a communications network using the communications module. The at least one processor may be further configured to receive, from a computing system, first data specifying a plurality of first services available to the device. In some instances, the device may have a corresponding first device type, the first services may be consistent with the first device type, and the first data may be indicative of an authentication of the device. The at least one processor may also be configured to store the first data within a portion of the storage unit, and the storage of the first data may provision the device with the available first services. Additionally, the at least one processor may be configured to detect an additional device connected to the communications network, and the additional device may have a corresponding second device type. In response to the detection, the at least one processor may identify a subset of the first services that is consistent with the second device type, and may transmit a portion of the stored first data that specifies the subset of the first services to the additional device across the communications network. In some instances, the additional device may be configured to process the portion of the stored first data to provision the additional device with the subset of the first services prior to an authentication of the additional device.

In other aspects a computer-implemented method may include establishing, by at least one processor, a connection with a communications network, and receiving, by the at least one processor, and from a computing system, first data specifying a plurality of first services associated with the device. In some instances, the device may have a corresponding first device type, the first services may be consistent with the first device type, and the first data may be indicative of an authentication of the device. The computer-implemented method may also include performing, by the at least one processor, operations that store the first data within a portion of a storage unit, and the storage of the first data may provision the device with the available first services. The computer-implemented method may also include detecting, by the at least one processor, an additional device connected to the communications network, the additional device having a corresponding second device type. In response to the detection, the computer-implemented method may include identifying, by the at least one processor, a subset of the first services that are consistent with the second device type, and transmitting, by the at least one processor, a portion of the stored first data that specifies the subset of the first services to the additional device across the network. In some aspects, the additional device may be configured to process the portion of the stored first data to provision the additional device with the subset of the first services prior to an authentication of the additional device.

Additionally, in certain aspects, an apparatus may include a communications module, a storage unit storing instructions, and at least one processor coupled to the communications module and the storage unit and configured to execute the instructions to establish a communications session with a first device across a network, and obtain first data identifying a plurality of first services that are provisioned to the first device by a computing system. In some instances, the first device may be associated with a first device type, and the first data may be indicative of an authentication of the device. The at least one processor may also be configured to detect a second device connected to the communications network, the second device having a corresponding second device type. Further, the at least one processor may be configured to determine that a subset of the first services is consistent with the second device type, and transmit second data identifying the subset of the first services to the computing system. In certain instances, the computing system being configured to provide, to the second device, service data that provisions the second device with the subset of the first services prior to an authentication of the second device.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
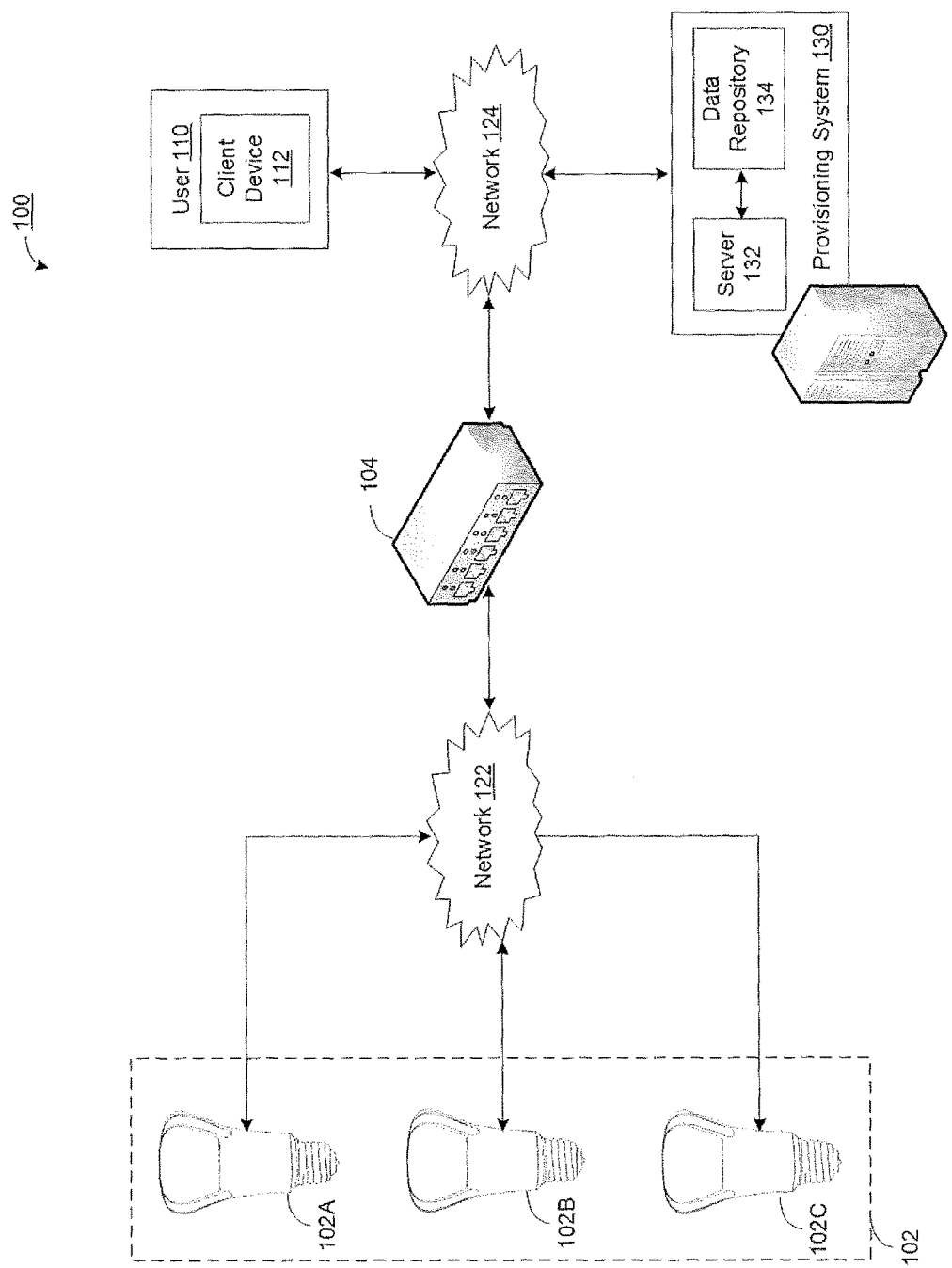
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

This specification describes exemplary computer-implemented systems and processes that automatically provision one or more services available to an Internet-of-Things (IoT) device upon connection to and registration onto communications network. In certain aspects, the exemplary systems and processes described below may "provision" a service to the registered IoT device by supplying data that enables the registered IoT device to perform operations consistent with that provisioned service. For example, the supplied data may include, but is not limited to, elements of executable code associated with the service (e.g., application modules, plug-ins, widgets, etc.), one or more service-related cryptograms, data authenticating one or more user credentials, and other service-related data, which the registered IoT device may selectively store and process to implement the provisioned service, either alone or in conjunction with other computing systems connected to the registered IoT device over the communications network.

In certain aspects, IoT devices consistent with the disclosed embodiments may include devices characterized by varying sensor, processing, storage, interface, and/or communications capabilities. Additionally, in some aspects, the one or more provisioned services may be consistent with sensor, processing, storage, interface, and/or communications capabilities of the IoT devices, and further, may be associated with and available to an authenticated owner or owners of the IoT devices. For example, the one or more services may include, but are not limited to, payment services (e.g., provided by corresponding financial institutions, utilities, merchants, governmental entities, etc.), device-configuration services (e.g., which enable an owner of a device to configure one or more operations characteristics of the device), and/or access control services (e.g., which enable the owner of the device to grant the device access to various computational resources available to the owner). The disclosed embodiments are not limited to these services, and in other instances, the disclosed embodiments may provision any additional or alternate service that is available to the authenticated owner or owners and consistent with the capabilities of the IoT devices.

I. Exemplary Computing Environments

FIG. 1 illustrates an exemplary computing environment 100, consistent with certain disclosed embodiments. In one aspect, computing environment 100 may include a plurality of Internet-of-Things (IoT) devices 102, which may be connected to and exchange data with a hub device 104 across a communications network, such as network 122. For example, as illustrated in FIG. 1, IoT devices 102 may include a first IoT device 102A, a second IoT device 102B, and a third IoT device 102C. The disclosed embodiments are, however, not limited to three IoT devices communicating across network 122, and in further embodiments, IoT devices 102 may include any additional or alternate number of connected IoT devices. Computing environment 100 may also include a client device 112 and a provisioning system 130, and an additional communications network, e.g., network 124, which may interconnect hub device 104, client device 112, and provisioning system 130.

In certain embodiments, IoT devices 102 may include a plurality of individual devices or "things" that possess functionality sufficient to establish and maintain communications with hub device 104 across network 122 (and additionally or alternatively, with other components of computing environment 100, either through hub device 104 or directly across networks 122 and/or 124). Individual IoT devices consistent with the disclosed embodiments may include, but are not limited to, a handheld, wearable, or embedded computing device (e.g., a smartphone, a tablet computer, a smart watch, a wearable fitness monitor, a device in communication with a smart fabric or textile, etc.); a wireless printer or copy machine; a wired or wireless network router; a network-connected lighting fixture (e.g., a LED-based smart light bulb), a network-connected appliance (e.g., a "smart" refrigerator, stove, coffee-maker, furnace, heat pump, etc.); a network-connected, smart thermostat; and/or a network-connected component of a security or access-control system (e.g., a network-connected digital camera, a "smart" lock, etc.).

In certain aspects, each of IoT devices 102 may include one or more tangible, non-transitory memories that store data and/or software applications (e.g., one or more executable application modules), and one or more hardware-based processors (e.g., a micro-processor or micro-controller) configured to execute portions of the stored software applications. For example, IoT devices 102 may store, in the corresponding memories, software applications that, when executed by the corresponding processing devices, cause IoT devices 102 to perform operations consistent with the provisioned services. Further, each of IoT devices 102 may also include communications module, such as a wireless transceiver device, coupled to the corresponding processors and configured by the corresponding processors to establish and maintain communications sessions with hub device 104 across network 122, as described below.

One or more of IoT devices 102 may also include a sensor capable of detecting an operational status, a device characteristic, and additionally or alternatively, a consumption of one or more resources at various temporal intervals during an operation of the one or more of IoT devices 102. By way of example, sensors consistent with the disclosed embodiments may include, but are not limited to, positional sensors (e.g., global positioning system (GPS) units), accelerometers, temperature sensors, motion sensors, sensors capable of measuring a consumption of electricity, water, or other resources, sensors capable of measuring units of received or transmitted data, and/or sensors capable of detecting a state of corresponding actuator devices, such as fluidic valves and electrical switches. The corresponding processors may, in some instances, execute portions of the stored software instructions to generate and data indicative of the time-varying operational status, device characteristics, and/or consumption, and to store portions of the generated data within the corresponding tangible, non-transitory memories.

Hub device 104 may, in some aspects, include a computing device (e.g., a smart phone, tablet computer, etc.) or a computing system configured to establish communications sessions with IoT devices 102 and manage interactions between IoT devices 102 and other components of computing system 100, such as provisioning system 130 across network 124. For instance, hub device 104 may include one or more tangible, non-transitory memories that store data and/or software instructions (e.g., one or more application modules), and one or more processors configured to execute portions of the stored software applications. In certain embodiments, and as described below, hub device 104 may store application modules that, when executed by the one or more processors, cause hub device 104 to detect IoT devices 102 communicating across network 122, register IoT devices 102 onto network 122 and, in conjunction with provisioning system 130, perform operations that provision one or more available services to IoT devices 102.

In certain aspects, network 122 may facilitate direct communication and data exchange between each of IoT devices 102, and further, between each of IoT devices 102 and hub device 104, and may include one or more wireless communication networks or mediums of short-range, digital data communication. Examples of network 122 include, but are not limited to, a wireless local area network (e.g., a wireless "LAN" or "WiFi" network), a RF network, a Near Field Communication (NFC) network, an optical communications network (e.g., a wireless infrared (IR) communications network, etc.), a Bluetooth™ communications network (e.g., networks using Bluetooth™ or Bluetooth LE™ communications protocols), or a wireless Metropolitan Area Network (MAN) connecting any of the communications networks described above. Additionally, and consistent with exemplary embodiments of the present disclosure, local network 122 may include a private or internal network or networks, a wide area network (e.g., a "WAN," such as the Internet), and/or a publicly accessible network or networks interconnected via one or more communication protocols, including, but not limited to, hypertext transfer protocol (HTTP), transmission control protocol/internet protocol (TCP/IP), extensible messaging and presence protocol (XMPP), message queuing telemetry transport (MQTT) protocols, constrained application protocol (CoAP), data distribution service (DDS) protocols, ZigBee™ communications protocols, and NFC protocols.

Provisioning system 130 may be a computing system configured to execute software instructions (e.g., one or more executable application modules) that perform one or more operations consistent with disclosed embodiments. In some aspects, provisioning system 130 may correspond to a distributed system that may include computing components distributed across one or more networks, such as network 124, or other networks. Furthermore, provisioning system 130 may also be associated with a business entity, e.g., a financial institution, an e-commerce retailer, and/or a physical retailer, which may be associated with and/or provide one or more of the provisioned services. For example, and as described below, provisioning system 130 may be associated with a financial institution, and one or more of the services provisioned to IoT devices 102 may include a payment service associated with an account held by an owner or owners of IoT devices 102 at the financial institution.

In some aspects, provisioning system 130 may include computing components configured to store, maintain, and generate data and software instructions. For example, provisioning system 130 may include one or more servers (e.g., server 132) and tangible, non-transitory memory devices (e.g., data repository 134). Server 132 may include one or more computing devices that may be configured to execute software applications (e.g., one or more executable application modules) to perform one or more processes consistent with the disclosed embodiments. In one example, server 132 may be a computing device that executes software instructions (e.g., application modules, etc.) that, as described below, may authenticate an identity of an owner IoT devices 102, authenticate and verify an identity of IoT devices 102, and further, provide data to IoT devices 102 that facilitates a performance of operations consistent with one or more available services.

In some instances, the available services may be consistent with one or more sensor, processing, storage, interface, and communications capabilities of IoT devices 102, and the provided data may include, but is not limited to, elements of executable code (e.g., application modules, etc.), service-related cryptograms, authentication data, and/or other service-related data that enables IoT devices 102 to perform the operations consistent with the available services. Additionally, the provided data, upon receipt and processing by IoT devices 102, may provision IoT devices 102 with the available services, as described below.

In one embodiment, server 132 may include a computer (e.g., a personal computer, network computer, server, or mainframe computer) having one or more processors that may be selectively activated or reconfigured by computer programs. In one aspect, server 132 (or other computing components of provisioning system 130) may be configured to provide one or more websites, digital portals, etc., that provide services consistent with the business entity, such as a digital e-commerce or banking portal, and services consistent with disclosed embodiments. For instance, server 132 may be configured to provide information associated with a requested web page over network 124 to a client device (such as client device 112), which may render the received information and present content from the web page on a display device, e.g., a touchscreen display unit. Additionally, server 132 may be incorporated as a corresponding node in a distributed network, and additionally or alternatively, as a corresponding networked server in a cloud-computing environment. Furthermore, server 132 may communicate via network 120 with one or more additional servers (not shown), which may facilitate the distribution of processes for parallel execution by the additional servers.

Data repository 134 may include one or more memories that are configured to store and provide access to data and/or software instructions. Such memories may include tangible non-transitory computer-readable media that store software instructions that, when executed by one or more processors (e.g., of server 132), perform one or more operations consistent with disclosed embodiments, as described below. Data repository 134 may also be configured to store information relating to the business entity, such as information identifying one or more authentication credentials associated with one or more owners of IoT devices 102 and further, information verifying the identity (e.g., device identifiers, etc.) of IoT devices 102.

In some embodiments, client device 112 may be a computing device, such as, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments. In certain embodiments, client device 112 may be associated with one or more users, such as user 110. For instance, user 110 may operate client device 112 and may do so to cause client device 112 to perform one or more operations consistent with the disclosed embodiments.

Client device 112 may, in some aspects, include one or more tangible, non-transitory memories that store data and/or software instructions, and one or more processors configured to execute software instructions. Client device 112 may include one or more display devices that display information to a user and one or more input device(s) to allow the user to input information to client device 112 (e.g., keypad, keyboard, touchscreen, voice activated control technologies, or any other type of known input device). Additionally, in certain aspects, client device 112 may store in memory one or more software applications that run on client device 112 and are executed by the one or more processors, such as web browsers and various applications associated with provisioning system 130, as described below.

Network 124 may include one or more communication networks or medium of digital data communication. Examples of communication network 124 include a local area network (LAN), a wireless LAN (e.g., a "WiFi" network), a RE network, a Near Field Communication (NEC) network, a wireless Metropolitan Area Network (MAN) connecting multiple wireless LANs, NFC communication link(s), and a wide area network (WAN), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 112 to send and receive data via applicable communications protocols, including those described herein.

Although computing environment 100 is illustrated in FIG. 1 with provisioning system 130 in communication with hub device 104 and client device 112 across network 124, and with IoT devices 102 in communication with hub device 104 across local network 122, persons of ordinary skill in the art will recognize that environment 100 may include any additional number of client devices 112, any additional number of connected, IoT devices and corresponding hub devices, and any additional number of computers, systems, or servers without departing from the spirit or scope of the disclosed embodiments. Further, although described in terms of networks 122 and 124, the disclosed embodiments are not limited to this network configuration, and in additional embodiments, any additional or alternate number of communications networks and corresponding network hub devices may interconnect the components of computing environment 100, including network configurations that include a single communications network with no network hub device. Moreover, although described in FIG. 1 in reference to individual IoT devices 102A, 102B, and 102C, persons of ordinary skill in the art will recognize that IoT devices 102 may include any additional or alternate number of individual IoT devices, which may include a single IoT device in communication with hub device 104 across local network 122.

II. Exemplary Computer-Implemented Systems and Processes that Automatically Provision Available Services to a First Connected, Internet-of-Things Device The disclosed embodiments may provide computer-implemented systems and processes that automatically provision available services to connected Internet-of-Things (IoT) devices, such as one or more of IoT devices 102 described above. In some instances, the available services may include, but are not limited to, payment services, device-configuration services, and access-control services, and the provisioned services may be available to an authenticated owner of the connected IoT device and further, may be consistent with sensor, processing, storage, interface, and/or communications capabilities of the connected IoT devices.

Figure 2A:
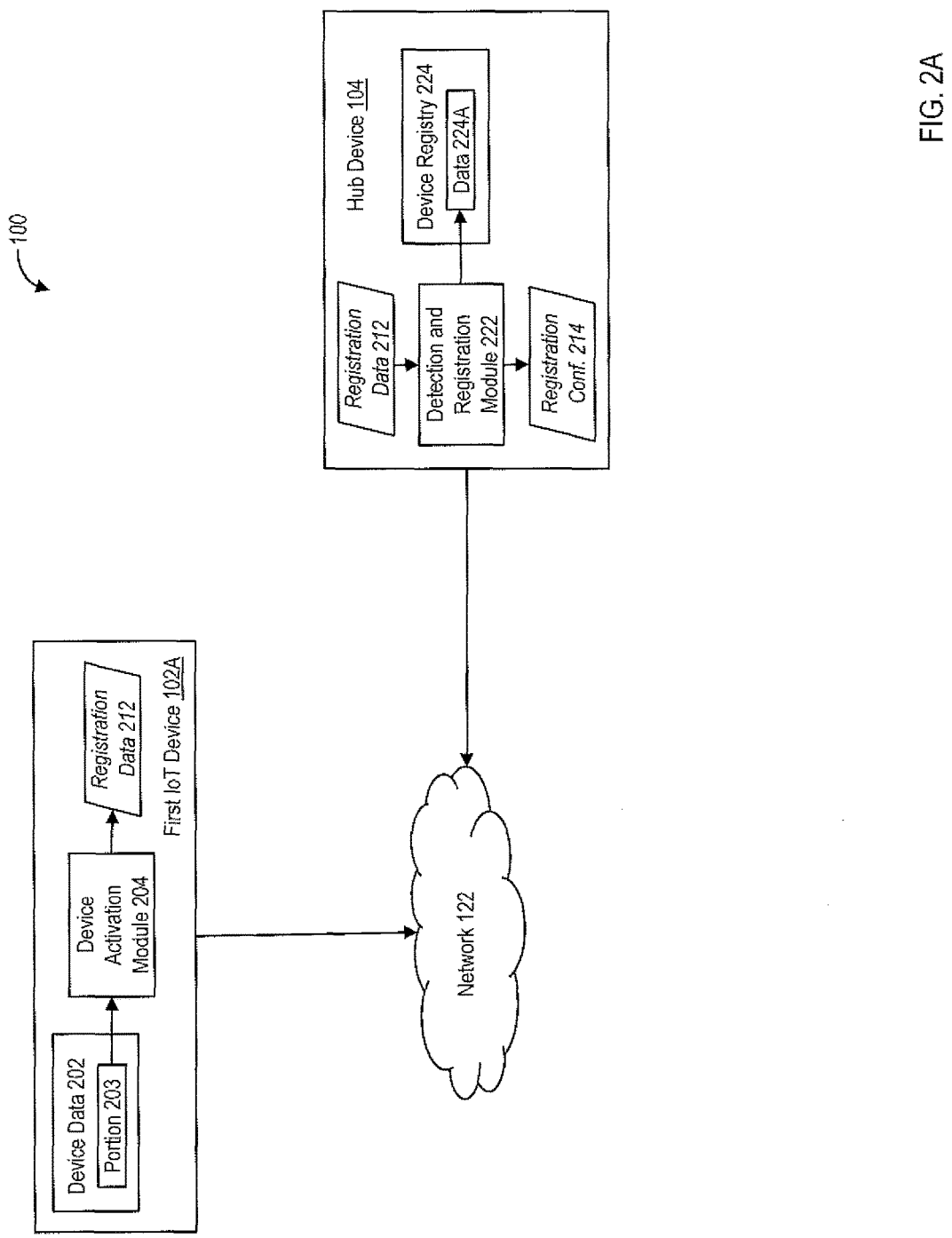
FIGS. 2A, 2B, 3A, and 3B are additional diagrams illustrating portions of an exemplary computing environment, consistent with the disclosed embodiments.
Figure 2B:
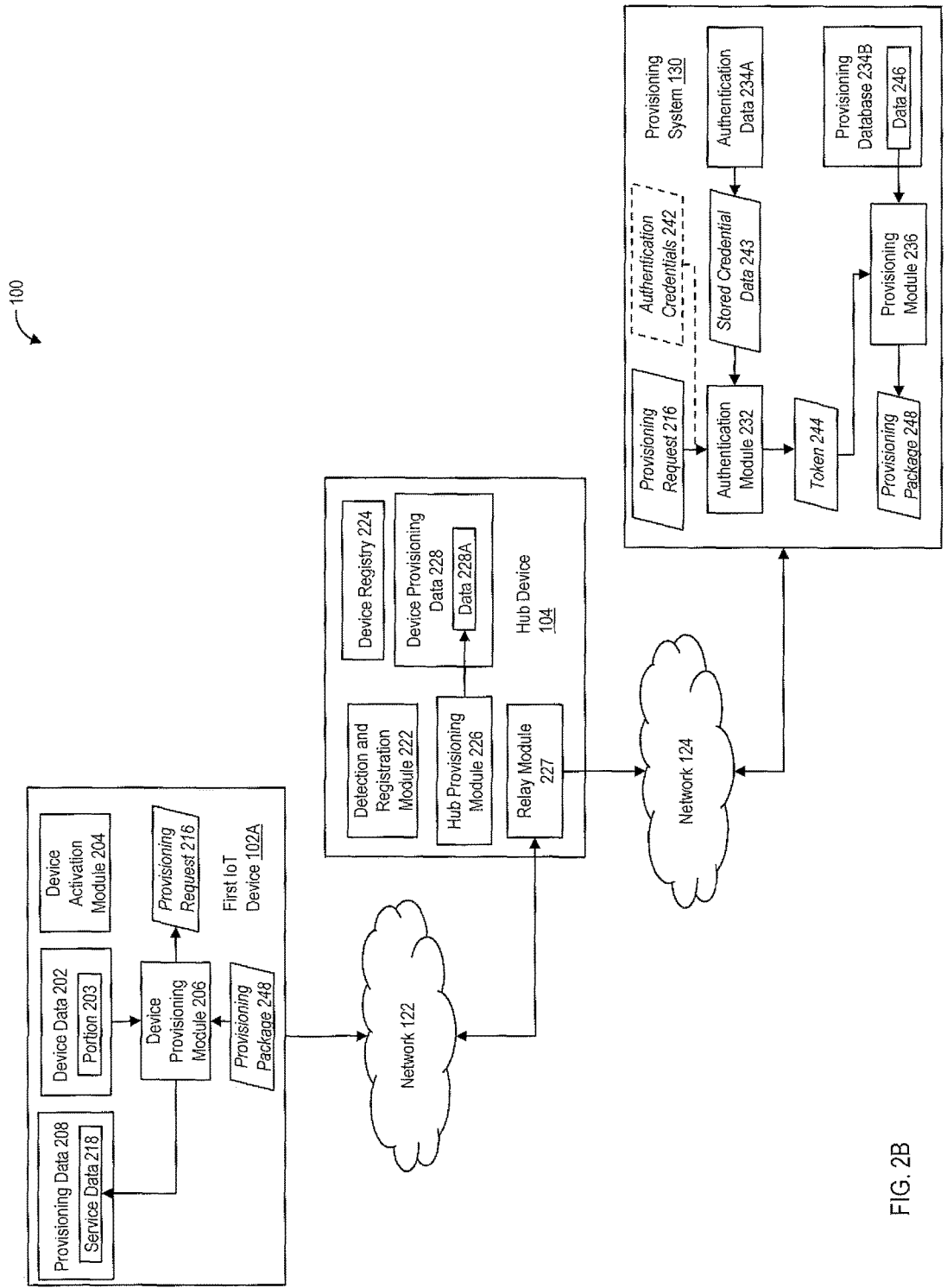

FIGS. 2A and 2B are diagrams illustrating interactions between certain elements of computing environment 100, in accordance with the disclosed embodiments. In some aspects, and as described below in reference to FIG. 2A, an owner (e.g., user 110) of a first one of IoT devices 102 (e.g., first IoT device 102A) may selectively activate first IoT device 102, which may establish communications with a hub device (e.g., hub device 104) over a corresponding communications network (e.g., network 122). Upon registration with hub device 104, a provisioning system (e.g., provisioning system 130) may perform operations that authenticate the owner of first IoT device 102A, verify an identity of first IoT device 102A, and in response to a successful owner authentication and device verification, generate a provisioning package that includes data facilitating a performance of operations consistent with one or more services that are available for provisioning to first IoT device 102A.

In certain aspects, and as described below, provisioning system 130 may transmit the generated provisioning package to first IoT device 102 across any of the communications networks described above (e.g., across network 124 and through hub device 104 to network 122), and using any of the exemplary communications protocols described above.

For example, as illustrated in FIG. 2A, user 110 may connect first IoT device 102A to an available source of electrical energy, which may cause first IoT device 102A to establish communications with network 122 and, in conjunction with hub device 104, register newly connected first IoT device 102A on network 122. In some instances, first IoT device 102A may represent a smart, LED-based light bulb, which user 110 may connect to the available source of electrical energy by installing first IoT device 102 within a corresponding light fixture, e.g., disposed within user 110's home or place of business. The disclosed embodiments are, however, not limited to smart light bulbs, and in further embodiments, first IoT device 102A may correspond to any additional or alternate device or "thing" capable of communication with hub device 104 and other components on computing environment 100 across network 122.

In an embodiment, and upon connection to the available source of electrical energy, first IoT device 102A may perform operations that establish its proximity to an accessible wireless communications network, such as network 122. In response to the established proximity, first IoT device 102A may perform operations that broadcast, across network 122, device registration data that uniquely identifies first IoT device 102A within network 122 and further, that facilitates a connection between first IoT device 102A and within network 122.

For example, first IoT device 102A may store, within the one or more tangible, non-transitory memories, device data 202 that includes a unique identifier of first IoT device 102A within network 122 (e.g., a device serial number) and various credentials that facilitate the connection of first IoT device 102A to network 122, which include, but are not limited to, digital certificates or tokens, cryptograms, pairs of identifiers and passwords, and subscriber identifier modules (SIMs). In one instance, the unique device identifier of first IoT device 102A, and additionally or alternatively, one or more of the connection credentials associated with device 102A, may be provisioned to first IoT device 102A by a manufacturer, and may remain constant and unchanged during operation of first IoT device 102A. In other instances, certain of the connection credentials, such as a digital certificate or token, may be overwritten and replaced by a corresponding service provider or hub device when first IoT device 102A establishes connections with additional service provider, or alternatively, in response to a change in ownership of first IoT device 102A.

In some aspects, a device activation module 204 of first IoT device 102A may access stored device data 202 and perform operations that extract a portion 203 of stored device data 202. Extracted data portion 203 may, for instance, include the includes the unique device identifier and additionally or alternatively, one or more of the connection credentials, and device activation module 204 may perform operations that package data portion 203 (e.g., the unique device identifier and/or one or more of the connection credentials) into device registration data 212, which first IoT device 102A may broadcast across network 122 using any of the exemplary communications protocols outlined above.

As illustrated in FIG. 2A, a detection and registration module 222 of hub device 104 may receive data broadcasted by newly connected first IoT device 102A across network 122 (which may include, but is not limited to registration data 212), and in response to the received data, may perform operations that detect the connection of first IoT device 102A to network 122 and register first IoT device 102A onto network 122. For instance, detection and registration module 222 may parse registration data 212 to obtain the unique device identifier of first IoT device 102A and additionally or alternatively, the one or more connection credentials associated with first IoT device 102A. In certain aspects, and based on the unique device identifier and/or the one or more connection credentials, detection and registration module 222 may perform operations that verify an identity of first IoT device 102A, and in response to a successful verification, register first IoT device 102A on network 122.

By way of example, hub device 104 may maintain, within one or more tangible, non-transitory memories, a device registry 224 that includes structured data records identifying and characterizing each device registered to communicate across network 122 (and additionally or alternatively, one or more additional wired or wireless communications networks associated with or managed by hub device 104). In certain aspects, and during the registration of first IoT device 102A, detection and registration module 222 may store the unique device identifier of first IoT device 102A, and additionally or alternatively, the one or more connection credentials of first IoT device 102A, within one of more of the structured data records of device registry 224, e.g., as first registered device data 224A. Detection and registration module 222 may also obtain data characterizing one or more capabilities of first IoT device 102A (e.g., sensing, processing, storage, interface, and/or communications capabilities), which may be linked to the unique device identifier and stored in data 224A.

In some instances, and upon completion of the exemplary registration processes described above, detection and registration module 222 may generate data confirming the registration of first IoT device 102A onto network 122, e.g., registration confirmation 214, which hub device 104 may transmit to first IoT device 102A across network 122. Registration confirmation 214 may, by way of example, include a unique network identifier of network 122 and additionally or alternatively, an address of hub device 104 (such as an IP address, etc.), and device activation module 204 of first IoT device 102A may store registration confirmation 214 within device data 202.

In certain embodiments, and in response to a successful activation and registration of first IoT device 102A onto network 122, provisioning system 130 may, in conjunction with hub device 104, perform operations that provision first IoT device 102A with one or more services that are available to user 110 (e.g., the owner of first IoT device 102A) and appropriate to the capabilities of first IoT device 102A. For example, as illustrated in FIG. 2B, a provisioning module 206 of first IoT device 102A may generate, and transmit to provisioning system 130, data requesting a provisioning of the one or more services to first IoT device 102A (e.g., provisioning request 216). In some aspects, provisioning module 206 may access device data 202, and obtain portions of device data 202 that uniquely identify first IoT device 102A within networks 122 and/or 124 (such as the unique device identifier described above), and additionally or alternatively, that identify one or more of the capabilities of first IoT device 102A. As described above, these identified capabilities may include, but are not limited to, a sensor capability of first IoT device 102A (e.g., types of sensors, etc.), a processing capability of first IoT device 102A (e.g., a processor type or speed), a storage capability of first IoT device 102A (e.g., an amount of ROM or RAM), an interface capability of first IoT device 102A (e.g., an existence or type of interface unit), and/or a communications functionality of first IoT device 102A (e.g., a type of communications module, supported communications protocols, etc.). Provisioning module 206 may, in some instances, incorporate the obtained portions of stored device data 202 into provisioning request 216 for transmission to provisioning system 130.

In additional aspects, provisioning request 216 may also include data, such as one or more authentication credentials of user 110, that facilitates that authentication of user 110 by provisioning system 130. For example, first IoT device 102A may include an interface unit, such as a touchscreen display unit, that presents a graphical user interface (GUI) prompting user 110 to input one or more authentication credentials (e.g., a user name, a password, etc.). In other instances, user 110 may establish communications between first IoT device 102A and client device 112 (e.g., through a wireless communications channel, such as a NFC or Bluetooth™ connection), which may present the GUI to user 110 through a corresponding display unit, and which may receive the one or more authentication credentials inputted by user 110 and provide the received authentication credentials to first IoT device 102A. In some aspects, provisioning module 206 may receive authentication data that includes the one or more authentication credentials, which provisioning module 206 may incorporate into provisioning request 216 for transmission to provisioning system 130, as described below.

Referring back to FIG. 2B, first IoT device 102A may transmit provisioning request 216 across network 122 to hub device 104 using any of the communications protocols outlined above. Hub device 104 may receive provisioning request 216, and a relay module 227 of hub device 104 may modify one or more portions of provisioning request 216 to include data identifying hub device 104 (e.g., a unique address of hub device 104, such as an IP address) and additionally or alternatively, a unique identifier of network 122. Relay module 227 may, in some aspects, perform operations that transmit provisioning request 216, as modified to incorporate the identifiers of hub device 104 and/or network 122, across communications network 124 to provisioning system 130 using any of the communications protocols outlined above.

By transmitting provisioning request 216 through hub device 104, certain of the disclosed embodiments may isolate first IoT device 102A (and further, others of IoT devices 102) and network 122 from direct communication with other components of computing environment 100, and hub device 104 may function as a firewall that reduces a likelihood of a successful attack on any of IoT devices 102 by malicious third parties. The disclosed embodiments are, however, not limited to protocols that funnel communications between IoT devices 102 and other components of environment 100 through hub device 104, and in additional embodiments, first IoT device 102A may directly transmit portions of provisioning request 216 to provisioning system 130, or any additional or alternate components of environment 100, using any of the communications protocols described above.

Provisioning system 130 may, in certain embodiments, receive provisioning request 216 from first IoT device 102A (e.g., from hub device 104 across communications network 124), and based on portions of provisioning request 216, server 132 may perform operating that include, but are not limited to: (i) authenticating an identity of user 110; (ii) obtaining data specifying one or more services available to authenticated user 110 and consistent with the capabilities of first IoT device 102A; and (iii) generating a corresponding provisioning package that includes portions of the obtained data, which provisioning system 130 may transmit the first IoT device 102A using any of the communications protocols described above. In some aspects, and as described above, server 132 may include one or more computing devices, and may store one or more modules of executable code and instructions that, when executed by the one or more computing devices, cause server 132 to perform operations consistent with the disclosed embodiments.

In certain aspects, provisioning request 216 may include data that uniquely identifies first IoT device 102A (e.g., a device serial number or other unique identifier of first IoT device 102A) and additionally or alternatively, data that characterizes one or more capabilities of first IoT device 102A (e.g., a processor type or speed, an amount of memory, a version of an operating system, etc.). Further, in some aspects, provisioning request 216 may also include data specifying one or more authentication credentials associated with user 110 (e.g., the owner of first IoT device 102A). For example, and as described above, an interface unit incorporated within first IoT device 102A may possess functionality sufficient to present a graphical user interface (GUI) that prompts user 110 to input the one or more authentication credentials, and further, to receive data specifying the one or more authentication credentials from user 110. Referring back to FIG. 2B, an authentication module 232 of server 132 may, in some instances, perform operations that extract the one or more authentication credentials from provisioning request 216, and as described below, authenticate an identity of user 110 based on a comparison of the extracted authentication credentials with stored authentication data.

In other aspects, and as described above, first IoT device 102A may not include an interface unit, or may include an interface unit that is incapable of receiving inputs of authentication credentials from user 110, and provisioning request 216 may not include authentication credentials sufficient for provisioning system 130 to authenticate the identity of user 110. In response to the lack of interface functionality, user 110 may access, through client device 112, a web page or other digital portal associated with provisioning system 130 (e.g., a graphical user interface (GUI) generated by a mobile application provided by or associated with provisioning system 130), which may prompt user 110 to provide, to client device 112, the one or more authentication credentials in conjunction with data that uniquely identifies first IoT device 102A, such as the device serial number described above. Client device 112 may receive the one or more authentication credentials and the data identifying first IoT device 102A, which may be packaged with data identifying client device 112 and transmitted to provisioning system 130 across communications network 124 using any of the communications protocols described above, e.g., as authentication credentials 242. Provisioning system 130 may receive authentication credentials 242, described below, authenticate an identity of user 110 based on a comparison of the received authentication credentials with stored authentication data.

In some aspects, authentication module 232 may access data repository 134 and obtain data identifying one or more stored authentication credentials associated with or assigned to user 110 (e.g., within stored authentication data 234A), and may perform operations that compare the one or more extracted authentication credentials against the one or more stored authentication credentials to authenticate an identity of user 110. Extracted and stored authentication credentials consistent with the disclosed embodiments may include, but are not limited to, an alpha-numeric user name or login associated with user 110, an alpha-numeric password associated with user 110, and one or more biometric credentials associated with user 110 (e.g., a digital image corresponding to user 110's fingerprint, a digital image of user 110's face, etc.). Additionally, in some instances, authentication data 234A may include data indicative of authentication credentials of not only user 110, but also of any additional or alternate users of provisioning system 130 or an underlying business entity associated with provisioning system 130, such as a financial institution.

For example, if authentication module 232 were to establish a mismatch between the extracted and stored authentication credentials of user 110, authentication module 232 may decline to authenticate user 101 and may generate an error message (not depicted in FIG. 2B). Provisioning system 130 may, in some instances, transmit the generated error message back to first IoT device 102A (e.g., if authentication module 232 extracted user 110's authentication credentials from provisioning request 216) or to client device 112 (e.g., if authentication module 232 extracted user 110's authentication credentials from authentication data 242) using any of the communications protocols outlined above. When rendered for presentation to user 110, either by an interface unit of first IoT device 102A or by a display unit of client device 112, the generated error message may identify the established mismatch between the authentication credentials and prompt user 110 to provide additional authentication credentials for transmission to provisioning system 130.

Alternatively, if authentication module 232 were to match the extracted and stored authentication credentials, authentication module 232 may authenticate the identity of user 110 and generate data indicative of the successful authentication. For example, the generated data may include, but is not limited to, a digitally signed token (e.g., token 244) generated using a corresponding asymmetric cryptographic scheme, and authentication module 232 may store token 244 within a corresponding portion of data repository 132. Additionally, and as described below, token 244 may be provided to first IoT device 102A, and to other IoT devices and network-connected devices associated with user 110, within a package of provisioned services, as described below.

In certain embodiments, authentication module 232 of server 132 may perform operations that authenticate the identity of user 101 based on authentication credentials stored within a locally accessible data repository, e.g., authentication data 234A of data repository 134. The disclosed embodiments are, however, not limited to authentication processes that leverage locally stored authentication credentials, and in further embodiments, authentication module 232 may authenticate the identity of user 110 based on authentication credentials stored in one or more remotely accessible data repositories. By way of the example, the remotely accessible data repositories may include, but are not limited to, cloud-based data repositories and data repositories maintained one or more third-party computing systems (e.g., associated with financial institutions, etc.) accessible to provisioning system 130 across communications network 124 (or across any additional or alternate public or private communications network, such as an intranet), and authentication module 232 may access authentication stored within the one or more remotely accessible data repositories through a call to a corresponding programmatic interface, such as an API.

Further, in some embodiments, provisioning system 130 may delegate the exemplary authentication processes described above to a third-party computing system (e.g., not depicted in FIGS. 2A and 2B) accessible to provisioning system 130 across communications network 124. The third-party computing system may include, but is not limited to, a computing system associated with a financial institution, which may hold one or more accounts on behalf of user 110, and which may provide one or more services (e.g., electronic bill-payment services, etc.) that leverage the accounts of user 110. In some aspects, and as described above, authentication module 232 may extract one or more of the authentication credentials provided by user 110 from provisioning request 216, and may provide the extracted authentication credentials to the third-party computing system through a corresponding programmatic interface, such as an API.

The third-party computing system may access stored authentications credentials associated with user 110 (e.g., from a local data repository or a remotely accessible data repository, such as cloud-based storage), compare the extracted and stored authentication credentials to authenticate user 110, and return, via the programmatic interface, data characterizing an outcome of the authentication process to authentication module 232. In some aspects, and based on the outcome of the authentication process, authentication module 232 may generate an error message or authentication confirmation 244 using any of the exemplary processes described above.

Referring back to FIG. 2B, and in response to a successful authentication of user 110, authentication module 232 may input token 244 to a provisioning module 236 (e.g., through a corresponding programmatic interface or API), and provisioning module 236 may perform operations that obtain data associated with one or more services available for provisioning to first IoT device 102A. For example, data repository 132 may include a provisioning database 234B, which includes structured data records that identify various services available to user 110, and additionally or alternatively, to one or more additional users of provisioning system 130. In some instances, each of the structured data records may be associated with a corresponding one of the available services, and may include data characterizing one or more corresponding devices (e.g., IoT devices 102) capable performing operations consistent with the available services. Additionally, each of the structured data records may be linked to additional stored data (e.g., in data repository 134), including elements of executable code (e.g., applications, plug-ins, widgets, etc.), service-related cryptograms, and additional service-related data, which facilitate the performance of operations consistent with the available services by IoT devices 102.

Provisioning module 236 may, in some aspects, access provisioning database 234B, and identify a subset of the structured data records that correspond to the services that are available for provisioning to first IoT device 102A. In one instance, provisioning database 234B may identify one or more payment-related services that, when performed by an IoT device, enable the IoT device to monitor its consumption of a particular resource (e.g., electrical energy, liquid or gaseous fuels, digital data), and to initiate an electronic payment to a utility, governmental entity, or other third-party entity that reflects the consumption of that particular resource.

For example, the one or more payment-related services may include, but are not limited to: (i) a first payment service that enables an IoT device to monitor its consumption of electrical energy, and to initiate an electronic payment to a utility for the consumed electrical energy (e.g., a transfer of appropriate funds from an account held by user 110 at a financial institution to an account of an electrical utility); (ii) a second payment service that enables a vehicle-based IoT device to monitor a rented vehicle's consumption of liquid fuel, and to initiate electronic payment to a provider of the rental car that reflects the fuel consumption; and/or (iii) a third payment service that enables an IoT device, such as a wireless router, to monitor a consumption of digital data by devices connected to the router, and to initiate an electronic payment to an Internet service provider the reflects the router's real-time consumption of digital data. In certain aspects, provisioning system 130 may obtain data specifying the payment-related services, such as elements of executable code, service-related cryptograms, and other service-related data, from computing systems associated with providers of the payment-related services, such as the financial institution. The disclosed embodiments are not limited to these examples of available payment services, and in other aspects, available services consistent with the disclosed embodiments may include any additional or alternate payment-related or non-payment-related service available to user 110 and appropriate to the capabilities of first IoT device 102A and other IoT connected devices owned by or accessible to user 110.

Referring back to FIG. 2B, provisioning module 236 may identify a subset of the structured data records of provisioning database 234B that correspond to services that are available for provisioning to first IoT device 102A, and may obtain data 246 from provisioning database 234B that specifies the available services, device configurations, and/or access privileges. In some instances, and as described above, data 246 may include, but is not limited to, elements of executable code (e.g., executable applications, widgets, plug-ins, etc.), service-related cryptograms, and other service-related data that facilitates the performance of operations consistent with the available services by first IoT device 102A.

By way of example, first IoT device 102A may represent a LED-based "smart" light bulb, and as described above, provisioning module 236 may obtain device data (e.g., from provisioning request 216) that identified the smart light bulb and further, that characterizes the capabilities of the smart light bulb. The obtained device data may, in some instances, identify a device type of first IoT device 102A (e.g., the smart light bulb), one or more sensors included within first IoT device 102A (e.g., sensors capable of monitoring the consumption of electrical energy by the smart light bulb), and processing, storage, and/or interface capabilities of first IoT device 102A (e.g., a type or speed of a processing device, and amount of physical memory, and/or presence or type of interface unit).

In certain aspects, and based on the obtained device data, provisioning module 236 may identify, within provisioning database 234B, one or more of the services that are available for provisioning to first IoT device 102A, and may obtain data 246 that facilitates the performance of operations consistent with the available services by first IoT device 102A. For instance, based on the obtained device data, provisioning module 236 may access provisioning database 234B and determine that the first payment service described above (e.g., that enables first IoT device 102A to monitor its consumption of electrical energy to initiate an electronic payment in accordance with the consumed electrical energy), is available for provisioning to first IoT device 102A. Provisioning module 236 may obtain, as data 246, elements of executable code, service-related cryptograms, and other service-related data that enables first IoT device 102A to perform operations consistent with the first payment service.

In certain aspects, provisioning module 236 may generate a provisioning package 248 that identifies the available services, and further, includes portions of obtained data 246, which facilitates a performance of operations consistent with the available services first IoT device 102A. Further, in some aspects, provisioning package 248 may also include token 244, on which first IoT device 102A may rely in performing operations consistent with the available services, such as the first payment service described above.

Provisioning module 236 may append, to provisioning package 248, data identifying hub device 104 (e.g., an IP address associated with communications network 124, as included within provisioning request 216), and provisioning system 130 may transmit provisioning package 248 to hub device 104 across communications network 124 using any of the exemplary communications protocols described above. In some aspects, relay module 227 of hub device 104 may receive provisioning package 248, may strip the data identifying hub device 104, and may perform operations that transmit provisioning package 248 to first IoT device 102A across network 122 using any of the exemplary communications protocols outlined above.

In additional aspects, and prior to relaying provisioning package 248 to first IoT device 102A, a hub provisioning module 226 of hub device 104 may process provisioning package 248 and extract data associated with the one or more services provisioned to first IoT device 102A. Hub provisioning module 226 may also perform operations that associate the extracted data with a unique device identifier of IoT device 102 (e.g., the device serial number), and store the extracted data and the associated device identifier within portions of one or more tangible, non-transitory memories, e.g., as a first portion 228A of device provisioning data 228. In further instances, hub provisioning module 226 may also extract token 244 (e.g., that identifies authenticated user 110, as described above) from provisioning package 224, associate token 244 with the unique device identifier of first IoT device 102A, and store token 244 and the associated device identifier within data portion 228A.

First IoT device 102A may, in some aspects, receive provisioning package 248 (e.g., as relayed by hub device 104), and a device provisioning module 206 may process provisioning package 248, extract the data associated with the one or more services provisioned to first IoT device 102A, and additionally or alternatively, token 244 that confirms an authenticity of user 110's identity. In some aspects, first IoT device 102A may store the extracted data portions within one or more tangible, non-transitory memories, e.g., within service data 218.

For example, and as described above, provisioning package 248 may include identify the first payment service provisioned to first IoT device 102A, which enables an IoT device to monitor its consumption of electrical energy, and to initiate an electronic payment to a utility for the consumed electrical energy. Provisioning package 248 may also include elements of executable code and payment-service cryptograms, that in conjunction with the token 244, facilitate the performance of operations consistent with the first payment service by first IoT device 102A. In certain instances, and upon storage of the data identifying the first payment service, the elements of executable code and payment-service cryptograms, and additionally or alternatively, token 244 within service data 218, first IoT device 102A may be provisioned with the first payment service, and first IoT device 102A may deliver the provisioned first payment service to user 110 by performing operations that monitor the real-time consumption of electrical energy and initiate the electronic payments to the electrical utility that reflect the monitored, real-time consumption.

Further, in some aspects, device provisioning module 206 may also transmit data confirming the successful provisioning of the one or more services to hub device 104 across network 122. Hub device 104 may receive the provisioning confirmation, and in response to the successful provisioning, hub provisioning module 226 may store service triggering data within the one or more tangible, non-transitory memories. In certain aspects, and upon detection of an established connection between an additional IoT device (e.g., an additional one of IoT devices 102) and network 122, the stored service triggering data may cause hub device 104 to perform operations that automatically provision at least a subset of the available services, device configurations, and access privileges to the additional IoT device, as described below.

III. Exemplary Computer-implemented Systems and Processes that Automatically Provision Available Services to Additional Connected Devices In certain embodiments, described above, a provisioning system (e.g., provisioning system 130) may identify one or more services that are available for provisioning to a registered IoT device, such as first IoT device 102A. For example, upon activation by owner 110, first IoT device 102A may exchange data across a wireless network with hub device 104, which may register first IoT device 102A onto the wireless network, and IoT device 102 may transmit a request for the one or more available services to provisioning system 130 through hub device 104 to provisioning system 130. In response to the provisioning request and to a successful authentication of the owner of first IoT device 102A (e.g., user 110), provisioning system 130 may generate a provisioning package that identifies the one or more available services and includes corresponding elements of executable code, service-related cryptograms, authentication tokens, and/or other service-related data, and may transmit the generated provisioning package back to IoT device 102 through hub device 104. In some aspects, IoT device 102 may receive and store portions of the provisioning package (such as the executable code, service-related cryptograms, and/or authentication tokens that enable first IoT device 102A to perform operations consistent with the available services) to provision first IoT device 102A with the available services.

In other embodiments, and in addition to first IoT device 102A, user 110 may obtain any number of additional connected IoT devices (e.g., second IoT device 102b and third IoT device 102C of IoT devices 102), which may be connected to sources of electrical energy, registered onto network 122, and further, provisioned with services that are available and appropriate to the capabilities of these additional connected IoT devices. For example, first IoT device 102A may correspond to a LED-based smart light bulb, which when provisioned with the first payment service described above, may perform operations that monitor its consumption of electrical energy during a particular monitoring period, and initiate a payment transaction with an electrical utility for the consumed electricity. In some aspects, and in an effort to better understand a corresponding usage of energy, user 110 may purchase a quantity of LED-based, smart light bulbs sufficient to replace each incandescent bulb within user 110's home or place of business.

In certain aspects, user 110 may individually connect each of these new LED-based, smart light bulbs to corresponding sources of electrical energy (e.g., through their installation into corresponding lighting fixtures). Further, and using any of the exemplary processes described above, a hub device, e.g., hub device 104, may perform operations that verify an identify of each of the newly connected smart light bulbs, and in response to a successful verification, register the newly connected smart light bulbs onto a corresponding communications network, such as network 122, by storing data uniquely identify the smart light bulbs and/or certain capabilities of these smart light bulbs within a device registry.

To provision each of the newly registered smart light bulbs with available services, and further, to facilitate the performance of operations consistent with these provisioned services by the newly registered smart light bulbs, provisioning system 130 may perform the exemplary authentication and provisioning processes described above for each of the newly registered smart light bulbs. For example, provisioning system 130 may receive a separate and distinct provisioning request for each of the newly registered smart light bulbs, and may associate each of the provisioning requests with a corresponding set of authentication credentials supplied by user 101. Provisioning system 130 may, for each received provisioning request, authenticate the identity of user 101 using any of the exemplary processes described above, and generate a corresponding provisioning package identifying the services available for provisioning to corresponding ones of the newly registered smart light bulbs.

In certain aspects, the separate authentication processes implemented by provisioning system 130 for each of the received provisioning request, and accordingly, on behalf of each of the newly registered smart light bulbs associated with user 101, may reduce the computational efficiency of provisioning system 130 and may reduce a speed at which the newly registered smart light bulbs are provisioned with available services. For example, and in response to each received provisioning request, provisioning system 130 may obtain one or more authentication credentials supplied by user 110 (e.g., from the corresponding provisioning request or from client device 112, as described above), may access locally or remotely stored authentication credentials, and may authenticate the identity of user 110 based on a comparison of the obtained and stored authentication credentials.

The resulting reduction in the computational efficiency of provisioning system 130 may, in some instances, slow the provisioning processes for the newly registered start light bulbs, and cause a temporal delay between a time at which the smart light bulbs are connected to and communicate across the communications network, and a time at which these smart light bulbs are fully functional to perform operations consistent with the available services. Moreover, the receipt of multiple, successive provisioning requests from each of the newly registered smart light bulbs by provisioning system 130, and the association of these provisioning requests with corresponding authentication credentials provided by user 110, may increase a risk of unauthorized access by malicious third parties, and further, increase a likelihood of authentication failures due to human error (e.g., typographical errors in provided authentication credentials, etc.). These authentication failures may, in certain instances, result in certain subsets of the newly registered smart light bulbs being fully provisioned with the available services, which others of the newly registered smart devices await authentication and provisioning.

A. Exemplary Hub-Device-Based Provisioning Processes

In further embodiments, one or more of the exemplary provisioning and authentication processes described above may be delegated from provisioning system 130 to hub device 104. For example, user 110 may connect a first IoT device, e.g., first IoT device 102A, to a source of electrical energy, and first IoT device 102A, hub device 104, and provisioning system 130 may collectively perform one or more of the exemplary processes described above to verify and register first IoT device 102A onto a communications network (e.g., network 122), authenticate user 110, and in response to a successful authentication, perform operations that provision first IoT device 102A with one or more available services.

As described above, user 110 may also obtain a number of additional connected IoT devices, and may connected a second one of the IoT devices, e.g., second IoT device 102B, to an available source of electrical energy. Second IoT device 102B and hub device 104 may, in some instances, collectively perform one or more of the exemplary processes described above that verify and register second IoT device 102B onto network 122, and in response to a successful verification and registration, second IoT device 102B may transmit, via hub device 104, a corresponding provisioning request to provisioning system 130.

In an embodiment, and in contrast to the exemplary processes described above, hub device 104 may detect the transmitted provisioning request, and in conjunction with provisioning system 130, may perform operations that provision, to second IoT device 102B, portions of the services that were previously provisioned to first IoT device 102A. For example, and as described below, hub device 104 may determine that second IoT device 102B supports at least a portion of the services previously provisioned to first IoT device 102A, and in response to the determination, hub device 104 may provide data identifying the previously provisioned services to provisioning system 130, which may perform operations to provision the identified services to second IoT device 102B. In other instances, and in response to the determination, hub device 104 may transmit data associated with the previously provisioned services directly to second IoT device 102B, which may process the transmitted data and perform operations consistent with those services previously provisioned to first IoT device 102A.

Figure 3A:
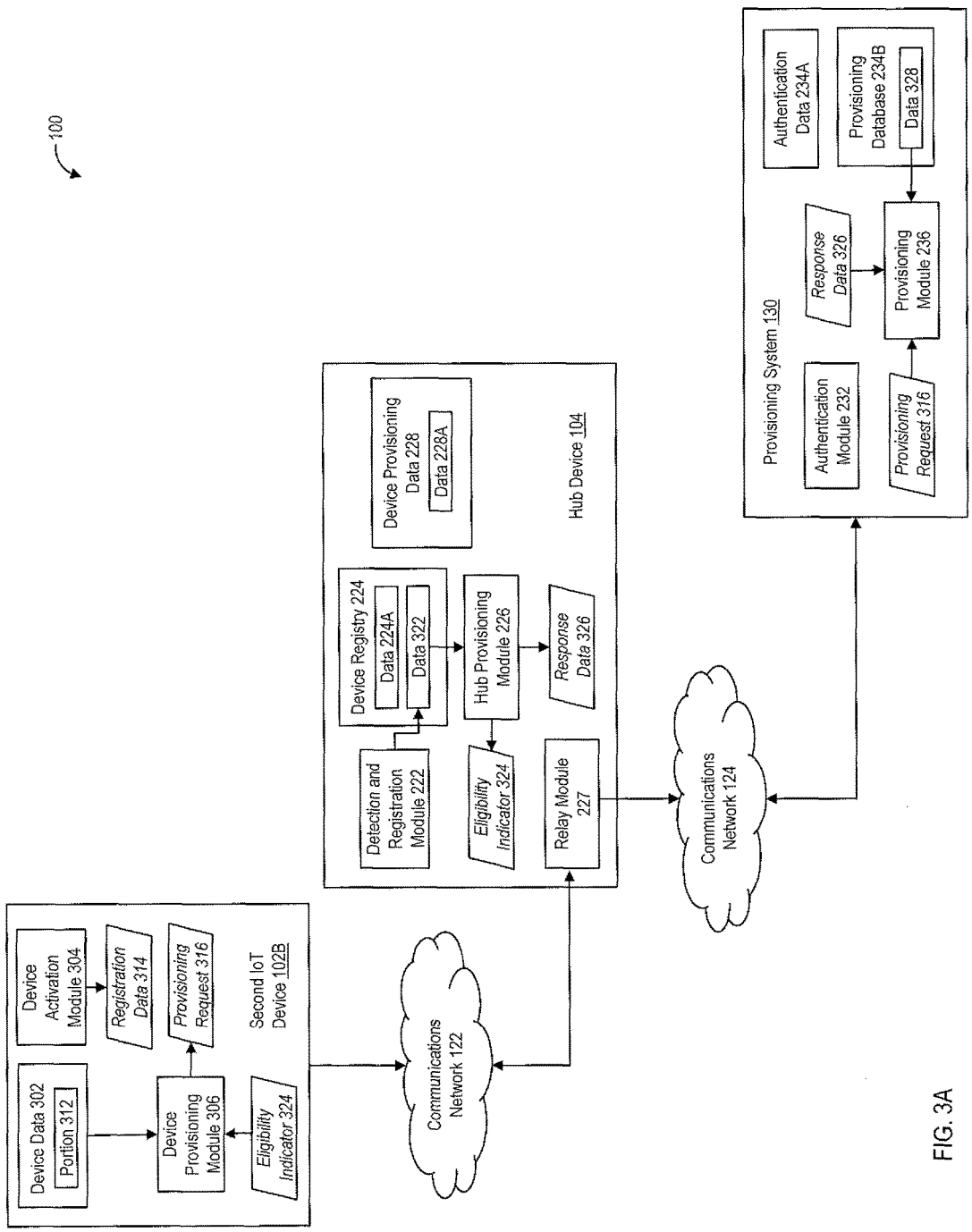
Figure 3B:
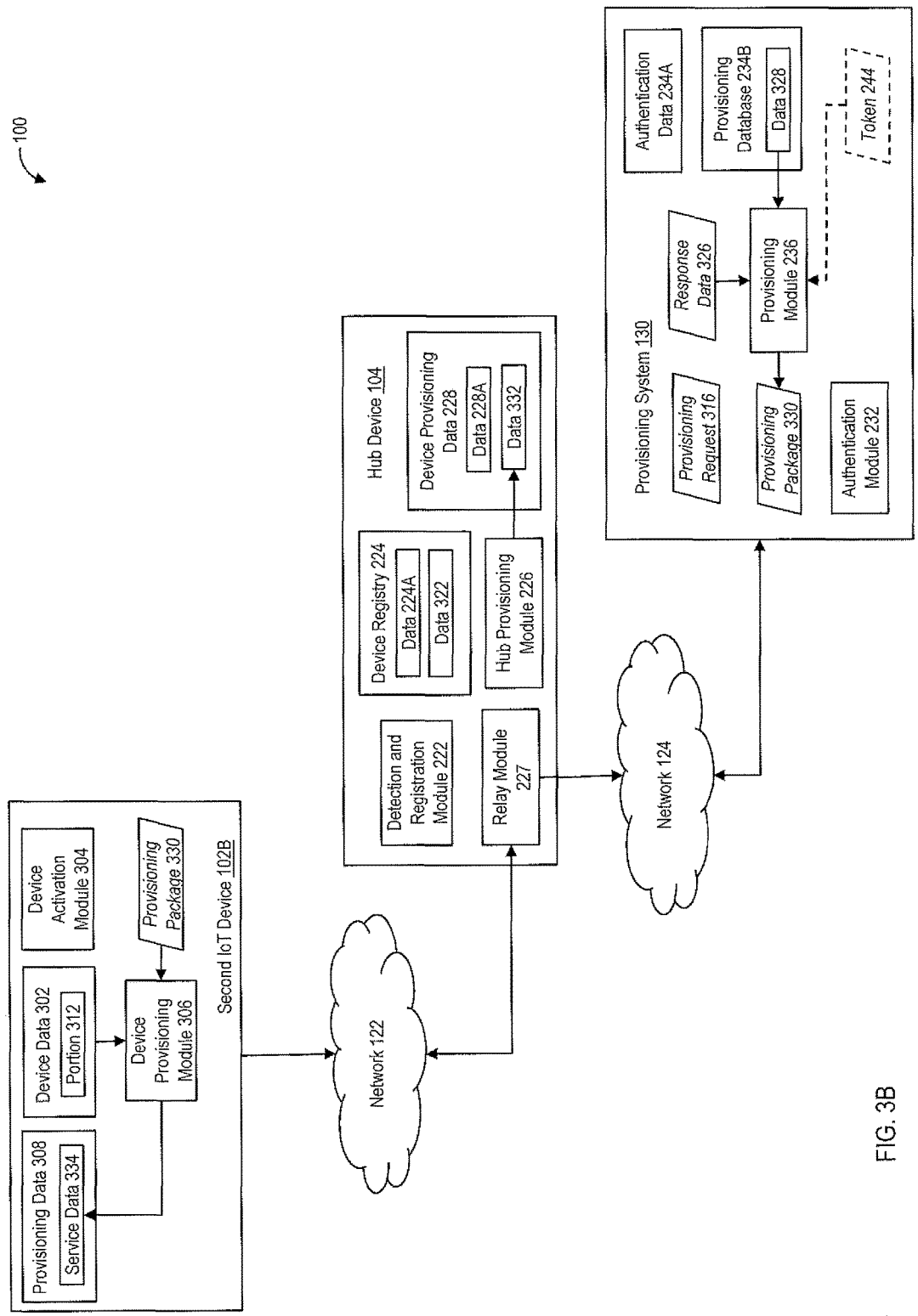

FIGS. 3A and 3B are diagrams illustrating interactions between certain elements of computing environment 100, in accordance with the disclosed embodiments. For example, as illustrated in FIG. 3A, user 110 may also obtain an additional connected IoT device, such as second IoT device 102B, and connect second IoT device 102B to an available source of electrical energy. In some instances, second IoT device 102B may represent an IoT-connected "smart" light bulb, which user 110 may connect to the available source of electrical energy by installing within a corresponding fixture, e.g., disposed within user 110's home or place of business. The disclosed embodiments are, however, not limited to IoT devices that include smart light bulbs, and in further embodiments, second IoT device 102B may correspond to any additional or alternate device or "thing" capable of communication with hub device 104 and other components on computing environment 100 across network 122.

Upon connection to the available source of electrical energy, second IoT device 102B and hub device 104 may perform any of the exemplary operations described above to verify an identity of second IoT device 102B, and in response to a successful verification, register second IoT device 102B onto network 122. For example, second IoT device 102B may store, within one or more tangible, non-transitory memories, device data 302 that includes a unique identifier of second IoT device 102B (e.g., a device serial number) and various credentials that facilitate the connection of second IoT device 102B to network 122, which include, but are not limited to, digital certificates or tokens, cryptograms, pairs of identifiers and passwords, and subscriber identifier modules (SIMs). In one instance, the unique device identifier of second IoT device 102B, and additionally or alternatively, one or more of the connection credentials associated with device 102B, may be provisioned to second IoT device 102B by a manufacturer, and may remain constant and unchanged during operation of second IoT device 102B. In other instances, certain of the connection credentials, such as a digital certificate or token, may be overwritten and replaced by a corresponding service provider or hub device when second IoT device 102B establishes connections with additional service provider, or alternatively, in response to a change in ownership of second IoT device 102B.

In some aspects, a device activation module 304 of second IoT device 102B may access stored device data 302 and perform operations extract a portion 312 of stored device data 302 that includes, but is not limited to, the unique device identifier and one or more of the connection credentials. Device activation module 304 may perform operations that package extracted data portion 312 into device registration data 314, which second IoT device 102B may broadcast across network 122 using any of the exemplary communications protocols outlined above.

As described above, detection and registration module 222 of hub device 104 may detect the connection of second IoT device 102B to network 122 and may receive registration data 314 from second IoT device 102B. Detection and registration module 222 may, in some instances, parse registration data 314 to obtain the unique device identifier of second IoT device 102B and additionally or alternatively, the one or more connection credentials associated with second IoT device 102B. In certain aspects, and based on the unique device identifier and/or the one or more connection credentials, detection and registration module 222 may perform operations that verify an identity of second IoT device 102B, and in response to a successful verification, register second IoT device 102B on network 122 by storing the unique device identifier of second IoT device 102B, and additionally or alternatively, the one or more connection credentials of second IoT device 102B, within one of more of the structured data records of device registry 224, e.g., as second registered device data 322.

In some instances, and upon completion of the exemplary registration processes described above, hub provisioning module 226 determine whether second IoT device 102B supports one or more of the services previously provisioned to first IoT device 102A by provisioning system 130, e.g., as stored within first portion 228A of device provisioning data 228. For example, hub provisioning module 226 may access second registered device data 322 to identify the sensor, processing, storage, interface, and/or communications capabilities of second IoT device 102B (e.g., the device capabilities of second IoT device 102B), and based on the identified device capabilities, hub provisioning module 226 may determine whether second IoT device 102B supports any of the services previously provisioned to first IoT device 102A, and additionally or alternatively, to other IoT devices associated with user 110.

For example, hub provisioning module 226 may establish that provisioning system 130 previously provisioned first IoT device 102A with a first payment service that enables first IoT device 102A to monitor its consumption of electrical energy in real-time and initiate a corresponding payment to an electrical utility for the consumed electrical energy. In addition, hub provisioning system 244 may determine the first payment service requires, among other things, one or more sensors capable of monitoring a consumption of electrical energy, tangible, non-transitory memories capable of storing application programs, user authentication tokens, and cryptograms associated with the first payment service, and processing capabilities sufficient to execute the application programs and initiate the corresponding payment with computing systems maintained by the electrical utility and/or user 101's financial institution.

In some instances, hub provisioning module 226 may determine that the sensor, processing, and storage capabilities of second IoT device 102B are consistent with those services previously provisioned to first IoT device 102A (e.g., the first payment service described above). In response to the determination, hub provisioning module 226 may perform operations that generate data confirming the support of second IoT device 102 for the previously provisioned services (e.g., an eligibility indicator 324), which hub device 104 may transmit to second IoT device 102B across network 122 using any of the exemplary communications protocols outlined above. Alternatively, if hub provisioning module 226 were to determine that the sensor, processing, and storage capabilities of second IoT device 102B were inconsistent with the previously provisioned services, second IoT device 102B may be incapable of supporting the previously provisioned services, and hub device 104 may continue to manage and relay communications between second IoT device 102B and other components of computing environment 100.

Second IoT device 102B may receive eligibility indicator 324, which causes a provisioning module 306 to perform operations that generate, and transmit to provisioning system 130, data requesting the provisioning of available services to second IoT device 102B (e.g., a provisioning request 316). In certain instances, and as described above, provisioning request 316 may include data that uniquely identifies second IoT device 102B (such as the device serial number described above), and additionally or alternatively, data that identifies one or more of the device capabilities of second IoT device 102B. For example, these device capabilities may include, but are not limited to, a sensor capability of first IoT device 102A (e.g., types of sensors, etc.), a processing capability of second IoT device 102B (e.g., a processor type or speed), a storage capability of second IoT device 102B (e.g., an amount of ROM or RAM), an interface capability of second IoT device 102B (e.g., an existence or type of interface unit), and/or a communications functionality of second IoT device 102B (e.g., a type of communications module, supported communications protocols, etc.).

In certain aspects, second IoT device 102B may transmit provisioning request 316 to across network 122 to hub device 104 using any of the communications protocols outlined above. Hub device 104 may receive provisioning request 316, and relay module 227 of hub device 104 may modify one or more portions of provisioning request 316 to include data identifying hub device 104 (e.g., a unique address of hub device 104, such as an IP address) and additionally or alternatively, a unique identifier of network 122. Relay module 227 may, in some aspects, perform operations that transmit provisioning request 316, as modified to incorporate identifiers of hub device 104 and/or network 122, across communications network 124 to provisioning system 130 using any of the communications protocols outlined above.

Provisioning system 130 may receive provisioning request 316 from second IoT device 102B (e.g., from hub device 104 across communications network 124), and based on portions of provisioning request 316, server 132 may perform operating that include, but are not limited to: (i) polling hub device 104 to identify one or more services that were previously provisioned to first IoT device 102A and that are available for provisioning to second IoT device 102B; (ii) obtaining data specifying the one or more previously provisioned services; and (iii) generating a corresponding provisioning package that includes portions of the obtained data, which provisioning system 130 may transmit the first IoT device 102A using any of the communications protocols described herein. In certain aspects, and in contrast to the exemplary provisioning processes described above, server 132 may not perform operations that re-authenticate user 110 prior to generating the provisioning package for transmission to second IoT device 102B.

Upon receipt of provisioning request 316, provisioning module 236 may process provisioning request 316 to extract the unique identifier of hub device 104 (e.g., the IP address of hub device 104), and may perform operations that poll hub device 104 to obtain data identifying those services that were previously provisioned to first IoT device 102A and that are available for provisioning to second IoT device 102B. For example, provisioning module 236 may generate a request for the data identifying the previously provisioned services (e.g., which may include an identifier of first IoT device 102A and/or authenticated user 110), and may transmit the generated request to hub device 104 through a corresponding programmatic interface, such as an API, associated with hub device 104.

Upon receipt of the request, hub device 104 may identify, within device provisioning data 228, one or more services previously provisioned to IoT devices associated with authenticated user 110, including first IoT device 102A. Further, and using any of the exemplary processes described above, hub provisioning module 226 may determine that the sensor, processing, and storage capabilities of second IoT device 102B are consistent with at least a subset of those services previously provisioned to first IoT device 102A (e.g., the first payment service described above). In certain aspects, hub provisioning module 226 may generate, in response to the received request, response data 326 that identifies the subset of services previously provisioned to IoT devices associated with user 110 (e.g., such as the first payment service previously provisioned to first IoT device 102A), which hub provisioning module 226 may transmit back to provisioning system 130 through the corresponding programmatic interface or API.

As illustrated in FIG. 3B, provisioning system 130 may receive response data 326, which may be processed by provisioning module 236 to identify the subset of the previously provisioned services. In certain aspects, provisioning module 236 may access provisioning database 234B, as described above, and obtain data from provisioning database 234B (e.g., data 328) that includes, but is not limited to, elements of executable code (e.g., executable application modules, widgets, plug-ins, etc.), service-related cryptograms, and other service-related data that facilitates a performance of operations consistent with the subset of the previously provisioned services by second IoT device 102B.

In certain aspects, provisioning module 236 may generate a provisioning package 330 that identifies the subset of the previously provisioned services and includes portions of obtained data 328, which enables second IoT device 102B to perform operations consistent with that subset of the previously provisioned services. For example, the subset of the previously provisioned services may include the first payment service (e.g., which provisioning system 130 previously provisioned to first IoT device 102A), and provisioning package 330 may include executable application modules and payment-service cryptograms that facilitate a performance of operations consistent with the first payment service by second IoT device 102B. Additionally, as described above, provisioning package 330 may also include token 244, which confirms the prior authentication of user 110, upon which provisioning system 130 relied when provisioning the first payment system to first IoT device 102A.

Further, provisioning module 236 may append, to provisioning package 330, data identifying hub device 104 (e.g., an IP address associated with communications network 124, as included within provisioning request 316), and provisioning system 130 may transmit provisioning package 330 to hub device 104 across communications network 124 using any of the exemplary communications protocols described above. In some aspects, relay module 227 of hub device 104 may receive provisioning package 330, may strip the data identifying hub device 104, and may perform operations that transmit provisioning package 330 to second IoT device 102B across network 122 using any of the exemplary communications protocols outlined above.

In additional aspects, and prior to relaying provisioning package 330 to second IoT device 102B, hub provisioning module 226 may process provisioning package 330 and extract data associated with the subset of the previously provisioned services, which hub provisioning module 226 may associate with the unique device identifier of second IoT device 102B and store within portions of one or more tangible, non-transitory memories, e.g., as a second portion 332 of device provisioning data 228. In further instances, hub provisioning module 226 may also extract token 244 (e.g., that identifies authenticated user 110, as described above) from provisioning package 230, associate token 244 with the unique device identifier of second IoT device 102B, and store token 244 and the associated device identifier within second portion 332.

Second IoT device 102B may receive provisioning package 330 from hub device 104, and in some aspects, a device provisioning module 306 may process provisioning package 330 and extract data associated with the subset of the previously provisioned services (e.g., elements of executable code, one or more service-related cryptograms, other service-related data, etc.), which second IoT device 102B may store within one or more tangible, non-transitory memories, e.g., as service data 334.

In certain aspects, second IoT device 102B may access service data 334, and a corresponding processor may execute portions of the corresponding application modules, in conjunction with the service-related cryptograms and/or other service-related data, to perform operations consistent with the newly provisioned services. For example, as described above, the second IoT device 102B may be configured by portions of stored data 334 to perform operations consistent with the first payment service described above, which enables second IoT device 102B to monitor its consumption of electrical energy and initial and electronic payment transactions with a corresponding utility to account for the consumed electrical energy.

In certain aspects, a portion of the stored service data 334 may correspond to an authentication trigger that, when executed by the processor of second IoT device 102B, causes second IoT device 102B to authenticate the owner of second IoT device 102B. e.g., user 110, prior to performing operations consistent with the newly provisioned services. For example, the services may include the a payment service provided by a financial institution associated with provisioning system 130 (e.g., the first payment service described above), and the executed authentication trigger may cause second IoT device 102B to initiate one or more authentication processes that obtain, from provisioning system 130, data confirming a successful authentication of user 110 based on one or more supplied authentication credentials (e.g., an updated authentication token, such as token 244).

By way of example, second IoT device 102B may include a functional interface unit, such as a touchscreen display unit, and second IoT device 102B may perform operations that present, via the interface unit, a graphical user interface (GUI) prompting user 110 to supply corresponding authentication credentials, which include, but are not limited a user name, a password, and/or a biometric credential, such as a fingerprint. In some instances, second IoT device 102B may receive data indicative of the supplied authentication credentials, with may be packaged into an authentication request (not depicted in FIG. 3) and transmitted to provisioning system 130 through hub device 104 using any of the communications protocols and processes described above. Upon receipt of the authentication request by provisioning system 130, authentication module 232 may extract the data indicative of the supplied authentication credentials from the authentication request, and may perform any of the exemplary processes described above to authenticate the identity of user 110 based on a comparison of the supplied authentication credentials to corresponding stored authentication credentials associated with user 110.

In some instances, the functionality of the interface unit included within second IoT device 102B may be insufficient to present the GUI or receive the authentication credentials, or alternatively, second IoT device 102B may not include an interface unit. Due to the lack of the functional interface, or the lack of any interface, second IoT device 102B may be incapable of receiving authentication credentials from user 110, and in some aspects, may generate an "empty" authentication request (e.g., a request without authentication credentials) for transmission to provisioning system 130. In certain aspects, a receipt of the empty authentication request by provisioning system 130 may cause authentication module 232 to perform operations that generate and transmit data to client device 112 that, when rendered for presentation within a corresponding web page or other GUI (e.g., a GUI generated by a mobile application associated with provisioning system 130), prompts user 110 to input the one or more authentication credentials to client device 112. In other instances, authentication module 232 may generate an email, text, or social-media message that, when presented through a corresponding interface by client device 112, prompts user 110 to provide the one or more authentication message in a corresponding response, or alternatively, within the web page or GUI described above. Client device 112 may receive and transmit data indicate of the supplied authentication credentials to provisioning system 130 across communications network 124 (e.g., as authentication credentials 243, described above), and authentication module 232 may perform may perform any of the exemplary processes described above to authenticate the identity of user 110.

In some aspects, and in response to a successful authentication, authentication module 232 may generate data, e.g., an updated authentication token, that indicates the successful authentication of user 110's identity and identifies the successfully authenticated credentials. Provisioning system 130 may transmit the updated authentication token back to second IoT device 102B using any of the exemplary processes described above, and second IoT device 102B may store the updated authentication token in a portion of one or more tangible, non-transitory memories, e.g., within service data 334, and perform operations consistent with the one or more provisioned services (e.g., the first payment service described above, which may leverage the updated authentication token in response to the successful authentication of user 110's identity).

In other aspects, second IoT device 102B may inherit the prior authentication of user 110, as determined by provisioning system 130 during the provisioning of first IoT device 102A, and may perform operations consistent with the previously provisioned services (e.g., the first payment service described above) without any additional re-authentication of user 110's identity. For example, and as described above, provisioning package 330 may not only include data identifying and specifying the one or more provisioned services, but may also include token 244, which confirms the prior authentication of user 110's identity. In some aspects, device provisioning module 308 may store the data associated with the provisioned services and token 244 within one or more tangible, non-transitory memories, e.g., in service data 334, and second IoT device 102B may rely on the prior authentication of user 110 to perform operations consistent with the one or more provisioned services. Further, in some aspects, token 244, and thus, the prior authentication of user 110's identity, may be associated with a predetermined period of validity (e.g., one hour, one day, one week, etc.), and upon expiration of the predetermined validity period, second IoT device 102B may initiate one or more of the exemplary processes described above to re-authenticate the identity of user 110 and obtain an updated authentication token indicative the successful authentication. Accordingly, the disclosed embodiments may enable hub device 104, in conjunction with provisioning system 130, to automatically provision second IoT device 120B with available and appropriate services automatically upon registration with communication network 122, and without the delays associated with conventional provisioning processes, which authenticate and identity of a device owner upon receipt of each provisioning request.

Through certain embodiments, and in response to provisioning request 316, hub device 104 may provide data identifying one or more services previously provisioned to IoT devices associated with authenticated user 110 (e.g., first IoT device 102A), and provisioning system 130 may generate, and provide to second IoT device 102B, provisioning package 300 that facilitates a provisioning of the identified services to second IoT device 102B. In other embodiments, and in response to the receipt of provisioning request 316, hub provisioning module 226 of hub device 104 may determine that first IoT device 102A and second IoT device 102B represent a common IoT device (e.g., a single type of LED-based smart light bulbs), or similar devices having compatible capabilities (e.g., different brands of LED-based smart light bulbs having comparable power ratings), based on portions of first registered device data 224A and second registered device data 322.

In certain aspects, and based on the determined commonality or compatibility, hub provisioning module 226 may obtain, from first portion 228A of device provisioning data 228, data that identifies one or more services previously provisioned to first IoT device 102A, and further, that includes additional executable code elements, service-related cryptograms, and/or other service-related data that facilitate a performance of operations consistent with the previously provisioned services by second IoT device 102B. Hub provisioning module 226 may generate a corresponding provisioning package (not depicted in FIG. 3) that identifies the previously provisioned services and that includes portions of the obtained data (e.g., the executable code elements, service-related cryptograms, and/or the service-related data). Additionally, and in some instances, hub provisioning device 226 may also include data confirming a prior authentication of user 110, e.g., token 244, within the generated provisioning package.

In certain aspects, hub device 104 may transmit the generated provisioning package to second IoT device 102B across network 122 using any of the exemplary processes described above, and second IoT device 102B may receive the provisioning package and perform any of the processes described above to extract and store the data identifying and specifying the provisioned services. In some embodiments, by generating the provisioning package without recourse to provisioning system 130, hub device 130 may automatically provision second IoT device 102B with available services while simultaneously reducing the computational load on provisioning system 130 and the traffic across communications network 124.

Figure 4:
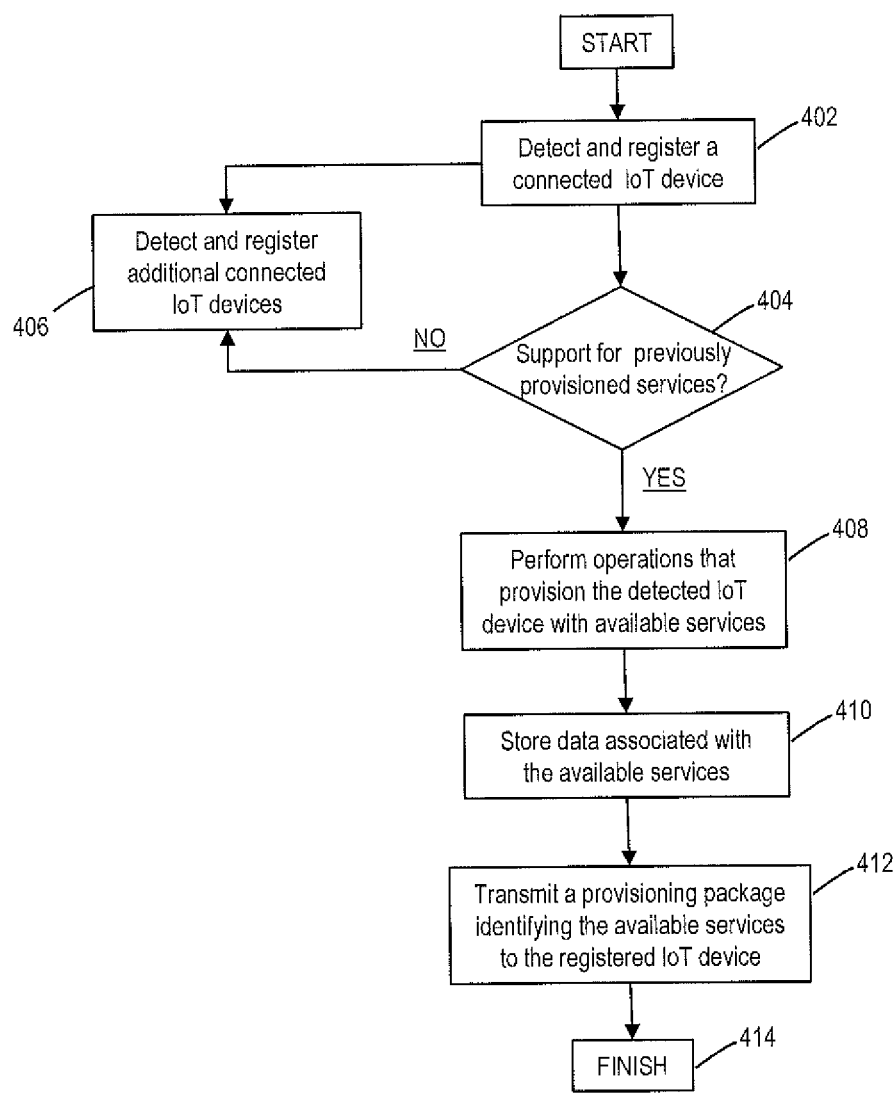
FIG. 4 is a flowchart of an exemplary process for automatically provisioning services to an Internet-of-Things (IoT) device, consistent with disclosed embodiments.

FIG. 4 is a flowchart of an example process 400 for automatically provisioning a connected, Internet-of-Things (IoT) device with one or more available services, in accordance with the disclosed embodiments. In some aspects, a hub device, e.g., hub device 104, may perform the steps of example process 400. For example, hub device 104 may perform operations that detect an activation of the connected IoT device, verify an identity of the connected IoT device, and in response to a successful verification, register the connected IoT device onto a corresponding communications network. Upon registration of the connected IoT device onto the communications network, hub device 104 may perform operations that provision the registered IoT device with one or more services previously provisioned to an additional connected IoT device associated with an authenticated owner of the registered IoT device.

For example, and using any of the exemplary processes described above, hub device 104 may verify an identity of a first connected IoT device (e.g., first IoT device 102A), and may register first IoT device 102A onto a communications network (e.g., network 122) by storing information identifying first IoT device 102A within a corresponding device registry. In additional instances, a provisioning system 130 may authenticate an identity of an owner of first IoT device 102A (e.g., user 110), and in response to a successful authentication, may perform any of the exemplary processes described above to provision first IoT device 102A with one or more available services, which include, but are not limited to, payment services, configuration services, and/or access-control services.

In some aspects, hub device 104 may detect an additional connected IoT device (e.g., second IoT device 102B) in communication with network 122, and may perform operations that verify and identity of second IoT device 102B and register second IoT device 102B onto network 122 (e.g., in step 402). For example, and as described above, hub device 104 may receive registration data that include a unique identifier of second IoT device 102B (e.g., a device serial number) and additionally or alternatively, one or more credentials that facilitate the connection of second IoT device 102B to network 122, which include, but are not limited to, digital certificates or tokens, cryptograms, pairs of identifiers and passwords, and subscriber identifier modules (SIMs). In some instances, and based on the unique device identifier and/or the one or more connection credentials, hub device 104 may verify the identity of second IoT device 102B, and in response to a successful verification, register second IoT device 102B on network 122 by storing the unique device identifier of second IoT device 102B, and additionally or alternatively, the one or more connection credentials of second IoT device 102B within a corresponding device registry.

Upon registration of second IoT device 102B onto network 122, hub device 104 may determine whether newly registered second IoT device 102B supports any of the services previously provisioned to other IoT devices associated with user 110, such as first IoT device 102A (e.g., in step 404). For example, hub device 104 may store data that identifies one or more services (e.g., payment services, configuration services, etc.) previously provisioned to first IoT device 102A, and using any of the exemplary processes described above, hub device 104 may determine whether second IoT device 102B is capable of performing operations consistent with these one or more previously provisioned services, and thus, whether second IoT device 102B supports any of these previously provisioned services.

If hub device 102B were to determine that second IoT device 12B fails to support any of the one or more services previously provisioned to first second IoT device 102B (e.g., step 404; NO), hub device 104 may detect additional connected IoT devices broadcasting data across network 122 (e.g., in step 406). In certain instances, and upon detection of the additional connected IoT devices, hub device 104 may perform any of the exemplary processes describes above to verify the identities of these additional connected IoT devices and register these additional connected IoT devices onto network 122.

Alternatively, if hub device 102B were to determine that second IoT device 102B supports at least a subset of the previously provisioned services (e.g., step 404; YES), hub device 104 may perform any of the exemplary processes described above to provision second IoT device 102B with at least the identified subset of the services, which were previously provisioned to first IoT device 102A, and additionally or alternatively, to any other connected IoT device associated with user 110 (e.g., in step 408).

In one embodiment, hub device 104 may, in conjunction with provisioning system 130, perform operations that provision second IoT device 102B with one or more of the services previously provisioned to first IoT device 102A (e.g., in step 408). For example, and as described above, hub device 104 may generate data (e.g., an eligibility indicator) confirming second IoT device 102B's support for at least the subset of the previously provisioned services, which hub device 104 may transmit to second IoT device 102B across network 122. In certain aspects, second IoT device 102B may receive the transmitted eligibility indicator, which may cause second IoT device 102B to generate, and transmit to provisioning system 130, data requesting the provisioning of the previously provisioned services to second IoT device 102B (e.g., a provisioning request). In certain instances, and as described above, the provisioning request may include data that uniquely identifies second IoT device 102B (such as the device serial number described above), and additionally or alternatively, data that identifies one or more capabilities of second IoT device 102B, which include, but are not limited to, sensor, processing, storage, interface, and/or communications capabilities of second IoT device 102B. In certain instances, second IoT device 102B may transmit the provisioning request to hub device 104 across communications network, and hub device 104 may receive and relay the provisioning request (as modified to include information that identifies hub device 104, such as an IP address) across communications network 124 to provisioning system 130 using any of the communications protocols outlined above.

Provisioning system 130 may receive the provisioning request from second IoT device 102B (e.g., from hub device 104 across communications network 124), and as described above, may perform operations that poll hub device 104 to obtain data identifying the subset of the services previously provisioned to devices associated with authenticated user 110, e.g., the owner of second IoT device 102B. For example, provisioning system 130 may generate a request for data identifying the subset of the previously provisioned services, and may transmit the generated request to hub device 104 through a corresponding programmatic interface, such as an API, associated with hub device 104.

Hub device 104 may receive the request in step 408, and using any of the exemplary processes described above, may generate response data that identifies the subset of the services previously provisioned to IoT devices associated with authenticated user 110, which include, but are not limited to, first IoT device 102A. In some aspects, hub device 104 may transmit the generated response data across communications network 124 to provisioning system 130, e.g., through the corresponding programmatic interface or API.

Provisioning system 130 may receive the response data from hub device 104, and using any of the processes described above, may access and obtain data that enables second IoT device 102B to perform operations consistent with the one or more previously provisioned services (e.g., the one or more services previously provisioned to first IoT device 102A, as identified within the response data). For example, the accessed and obtained data may include, but is not limited to, elements of executable code (e.g., executable applications, widgets, plug-ins, etc.), service-related cryptograms, and other service-related data that facilitates the performance of operations consistent with the previously provisioned services by IoT second device 102B. In certain aspects, provisioning system 130 may generate a provisioning package that identifies the previously provisioned services, and further, includes portions of the obtained data that enables second IoT device 102B to perform operations consistent with the previously provisioned services.

Additionally, as described above, provisioning package 330 may also include an authentication data, such as token 244, which confirms the prior authentication of user 110, upon which provisioning system 130 relied when provisioning the first payment system to first IoT device 102A. In certain instances, provisioning system 130 may append, to the provisioning package, data identifying hub device 104 (e.g., an IP address), and provisioning system 130 may transmit the provisioning package to hub device 104 across communications network 124 using any of the exemplary communications protocols described above.

Referring back to FIG. 4, hub device 104 may receive the transmitted provisioning package, and may process the provisioning package to extract data that identifies and specifies the services provisioned to second IoT device 102B (e.g., in step 410). In some instances, in step 410, hub device 104 may associate the extracted data with the unique device identifier of second IoT device 102B and store the data and associated unique device identifier within portions of one or more tangible, non-transitory memories. In further instances, hub device 104 may also extract the authentication data (e.g., that identifies the authenticated credentials of user 110, such as token 244) from the provisioning package, which hub device 104 may associate with the unique device identifier of second IoT device 102B, and store portions of one or more tangible, non-transitory memories, as described above. In some aspects, hub device 104 may strip the data identifying hub device 104 from the provisioning package, and may perform operations that transmit the provisioning package to second IoT device 102B across network 122 using any of the exemplary communications protocols outlined above (e.g., in step 412).

In other embodiments, hub device 104 may perform operations that directly provision second IoT device 102B with one or more of the services previously provisioned to first IoT device 102A (or alternatively, to one or more additional connected IoT devices associated with user 110). For example, when establishing the capability of second IoT device 102B to support the services previously provisioned to first IoT device 102A (e.g., in step 406), hub device 104 may establish that first IoT device 102A and second IoT device 102B represent a common IoT device (e.g., a single type of LED-based smart light bulbs) or similar devices having compatible capabilities (e.g., different brands of LED-based smart light bulbs having comparable sensing, processing, storage, interface, and/or communications capabilities).

In certain aspects, and based on the determined commonality or compatibility between first IoT device 102A and second IoT device 102B, hub device 104 may access stored data that enables second IoT device 102B to perform operations consistent with the one or more services previously provisioned to first IoT device 102A, such as elements of executable code (e.g., executable applications, widgets, plug-ins, etc.), service-related cryptograms, and/or other service-related data (e.g., in step 408). Further, in step 408, hub device 104 may also generate a corresponding provisioning package that identities the one or more services previously provisioned to first IoT device 102A and includes portions of the obtained data that enable second IoT device 102B to perform operations consistent with the previously provisioned services.

Further, and as described above, hub device 104 may store, within one or more tangible, non-transitory memories, data identities the one or more services previously provisioned to first IoT device 102A (e.g., which hub device 104 provisioned to second IoT device 102B) along with portions of the data that enables second IoT device 102B to perform operations consistent with these provisioned services (e.g., in step 410). In some aspects, hub device 104 may perform operations that transmit the provisioning package directly to second IoT device 102B across network 122 using any of the exemplary communications protocols outlined above (e.g., in step 412).

Upon transmission of the provisioning package to second IoT device 102B, exemplary process 400 may be complete in step 414. In certain aspects, second IoT device 102B may receive the transmitted provisioning package, and using any of the exemplary processes described above, may store portions of the transmitted provisioning package within locally accessible, tangible, non-transitory memories and perform operations consistent with the one or more provisioned services in response to a successful authentication of user 110, or alternatively, in reliance on a prior successful authentication of user 110.

B. Exemplary IoT-Device-Based Provisioning Processes

In certain embodiments, hub device 104 may perform operations that, in response a registration of second IoT device 102B onto network 122, automatically provision second IoT device 102B (and any additional or alternate IoT devices) with one or more services that were previously provisioned to first IoT device 102A. The disclosed embodiments are, however, not limited to the exemplary hub-based processes described above, and in other embodiments, first IoT device 102A may perform operations that, either individually or in conjunction with provisioning system 130, provision one or more available services to second IoT device 102B upon connection to and registration onto a corresponding communications network, such as network 122.

Figure 5A:
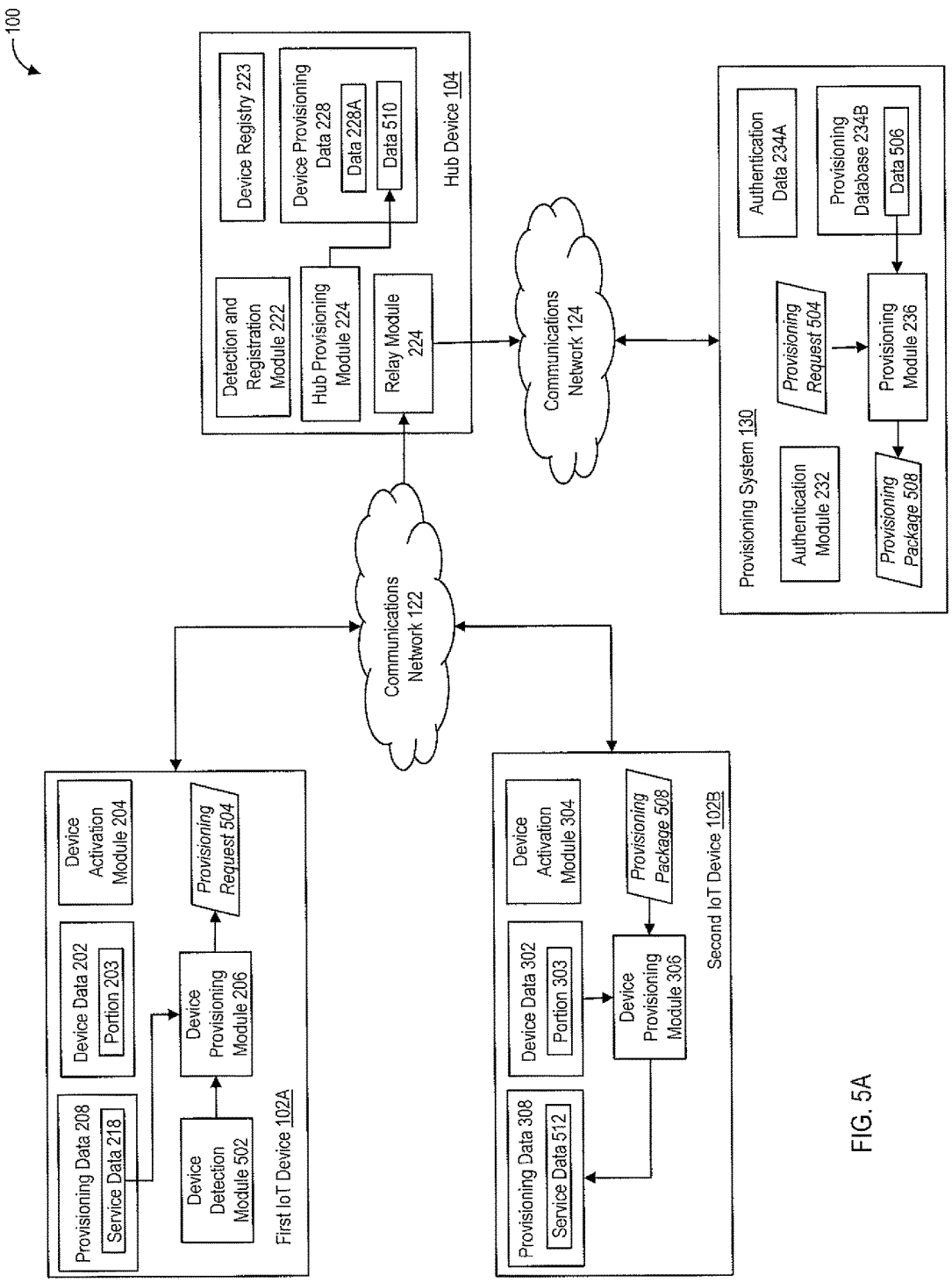
FIGS. 5A and 5B are additional diagrams illustrating portions of an exemplary computing environment, consistent with the disclosed embodiments.
Figure 5B:
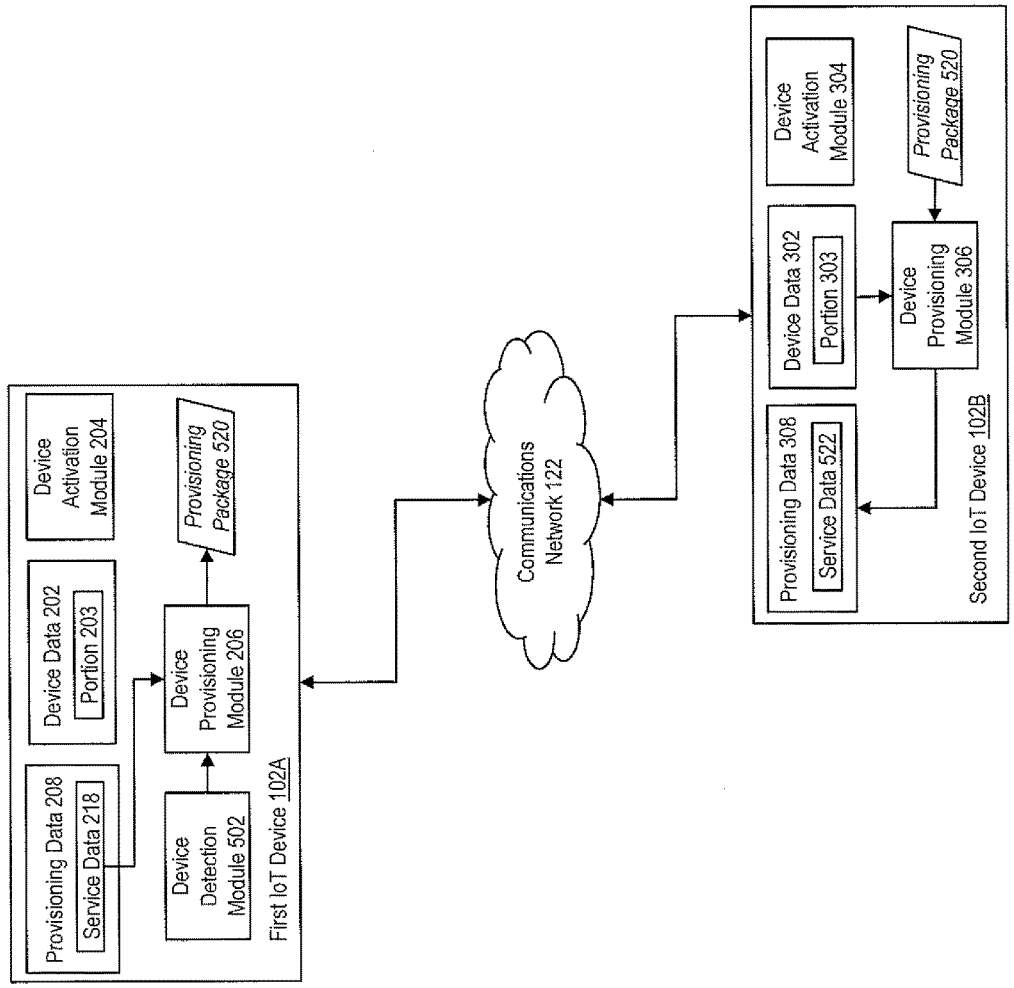

FIGS. 5A and 5B are diagrams illustrating interactions between certain elements of computing environment 100, in accordance with certain disclosed embodiments. For example, as illustrated in FIG. 5A, and using any of the exemplary processes described above, hub device 104 may perform operations that verify an identity of first IoT device 102A and register first IoT device 102A onto network 122, e.g., by storing first registered device data 224A within device registry 224. In response to the successful verification and registration, provisioning system 130 and/or hub device 104 may perform operations that provision first IoT device 102A with one or available services, such as payment devices, device-configuration services, and/or access-control services associated with authenticated user 110.

In some aspects, and as described above, first IoT device 102A may store portions of the data associated with the available services, and additionally or alternatively, data indicative of the successful authentication of user 110 (e.g., token 244) within one or more tangible, non-transitory memories, such as service data 218 of provisioning data 208.

Additionally, as described above, hub device 104 may store data indicative of the newly provisioned services (e.g., elements of executable code, service-related cryptograms, other service-related data, etc.) within one or more tangible, non-transitory memories, e.g., as a first portion 228A of device provisioning data 228.

Further, user 110 may also obtain an additional IoT device, such as second IoT device 102B, and connect second IoT device 102B to an available source of electrical energy. Upon connection to the available source of electrical energy, second IoT device 102B and hub device 104 may perform any of the exemplary operations described above to verify an identity of second IoT device 102B, and in response to a successful verification, register second IoT device 102B onto network 122, e.g., by storing data within device registry 224.

Upon successful completion of the registration processes described above, first IoT device 102A and second IoT device 102B may communicate with hub device 104 across network 122, and further, with additional components of environment 100 in communication with hub device 104 across various wired and wireless networks, such as provisioning system 130 across communications network 124. In other aspects, network 122 may correspond to a wireless mesh network that facilitates not only communications between first IoT device 102A, second IoT device 102B, and hub device 104, but also direct communications between first IoT device 102A and second IoT device 102B.

Referring to FIG. 5A, a device detection module 502 of first IoT device 102A may perform operations that detect second IoT device 102B upon its successful registration onto network 122. For example, device detection module 502 may obtain, from second IoT device 102B across network 122, data (e.g., data portion 312 of device data 312) that uniquely identifies second IoT device 102B, such as a device serial number, and further, that identifies one or more of the capabilities of second IoT device 102B, such as sensor, processing, storage, interface, and/or communications capabilities. Further, and based on the obtained data, device provisioning module 206 of first IoT device 102A may determine whether second IoT device 102B supports one or more of the services previously provisioned to first IoT device 102A by provisioning system 130, e.g., as stored within service data 218 of provisioning data 218.

For instance, and based on the portions of service data 218, device provisioning module 206 may establish that provisioning system 130 previously provisioned first IoT device 102A with a first payment service that enables first IoT device 102A to monitor its consumption of electrical energy in real-time and perform operations that initiate a corresponding payment to an electrical utility for the consumed electrical energy. In addition, device provisioning module 206 may determine the provisioned first payment service requires that a device include, among other things, one or more sensors capable of monitoring a consumption of electrical energy, tangible, non-transitory memories capable of storing application programs, user authentication tokens, and cryptograms associated with the first payment service, and processing capabilities sufficient to execute the application programs and initiate the corresponding payment with computing systems maintained by the electrical utility and/or user 110's financial institution.

In some instances, and based on the portions of the obtained data, device provisioning module 206 may determine that the capabilities of second IoT device 102B are consistent with at least a subset of the services previously provisioned to first IoT device 102A (e.g., the first payment service described above). In response to the determination, device provisioning module 206 may perform operations that generate a provisioning request (e.g., provisioning request 504), which includes data that identifies the one or more services previously provisioned to first IoT device 102A (e.g., the first payment service described above), data identifying second IoT device 102B, and further, data confirming the support of second IoT device 102 for the previously provisioned services. In some aspects, first IoT device 102A may transmit provisioning request 504 to hub device 104 across network 122, and as described above, relay module 227 of hub device 104 may modify a portion of provisioning request 504 to include a unique identifier of hub device 104 (e.g., an IP address of hub device 104), and forward provisioning request 504 to provisioning system 130 across communications network 124.

Provisioning system 130 may receive provisioning request 504 from first IoT device 102A (e.g., via hub device 104 across communications network 124), and based on portions of provisioning request 504, server 132 may perform operations that generate a corresponding provisioning package including data specifying the one or more services previously provisioned to first IoT device 102A, which are similarly supported by second IoT device 102B. For instance, provisioning module 236 may process provisioning request 504 to extract portions of data that uniquely identifying second IoT device 102B and further, that identify the one or more previously provisioned services supported by second IoT device 102B. Based on the extracted data portions, provisioning module 236 may access provisioning database 234B, as described above, and may obtain data 506 associated with the one or more previously provisioned services supported by second IoT device 102B. For example, data 506 may include, but is not limited to, elements of executable code (e.g., executable applications, widgets, plug-ins, etc.), service-related cryptograms, and other service-related data that facilitates the performance of operations consistent with the previously provisioned services.

In certain aspects, provisioning module 236 may generate a provisioning package 508 that identifies previously provisioned services supported by second IoT device 102B, and includes portions of obtained data 506, which enables second IoT device 102B to perform operations consistent with the previously provisioned services. For example, the previously provisioned services may include the first payment service (e.g., which provisioning system 130 previously provisioned to first IoT device 102A), and provisioning package 508 may include executable applications and service-related cryptograms that facilitate a performance of operations consistent with the first payment service by second IoT device 102B. Additionally, in certain aspects, provisioning package 508 may also include token 244, which confirms the prior authentication of user 110, upon which provisioning system 130 relied when provisioning the first payment system to first IoT device 102A.

Further, provisioning module 236 may append, to provisioning package 508, data identifying hub device 104 (e.g., an IP address associated with communications network 124), and provisioning system 130 may transmit provisioning package 508 to hub device 104 across communications network 124 using any of the exemplary communications protocols described above. In some aspects, relay module 227 of hub device 104 may receive provisioning package 508, may strip the data identifying hub device 104, and may perform operations that transmit provisioning package 508 to second IoT device 102B across network 122 using any of the exemplary communications protocols outlined above. In additional aspects, and prior to relaying provisioning package 508 to second IoT device 102B, hub provisioning module 226 may process provisioning package 508 and extract data that identifies and specifies the services newly provisioned to second IoT device 102B, which hub provisioning module 226 may associated with the unique device identifier of second IoT device 102B and store within portions of one or more tangible, non-transitory memories, e.g., as a second portion 510 of device provisioning data 228.

Second IoT device 102B may receive provisioning package 508 from hub device 104, and in some aspects, a device provisioning module 306 may process provisioning package 508 and extract data associated with the one or more provisioned services (e.g., elements of executable code, one or more service-related cryptograms, etc.), which second IoT device 102B may store within one or more tangible, non-transitory memories, e.g., as service data 512 of provisioning data 308. In certain aspects, second IoT device 102B may access portions of the stored data, and a corresponding processor of second IoT device 102B may execute portions of stored executable code to perform operations consistent with the one or more provisioned services, such as the first payment service described above (which enables second IoT device 102B to monitor its consumption of electrical energy and initial and electronic payment transactions with a corresponding utility to account for the consumed electrical energy).

In one instance, a portion of the stored software instructions may correspond to an authentication trigger that, when executed by the processing device of second IoT device 102B, causes second IoT device 102B to initiate processes that authenticate the owner of second IoT device 102B. e.g., user 110, prior to performing operations consistent with the provisioned services. For example, second IoT device 102B and provisioning system 130 may collectively perform any of the exemplary processes described above to authenticate the identity of user 110 and generate data, e.g., an updated authentication token, that indicates the successful authentication of user 110's identity and identifies the authenticated credentials. Provisioning system 130 may transmit the updated authentication token back to second IoT device 102B using any of the exemplary processes described above, and second IoT device 102B may store the updated authentication token in a portion of one or more tangible, non-transitory memories, e.g., within provisioning data 308, and perform operations consistent with the one or more provisioned services (e.g., the first payment service that may leverage the updated authentication token in response to the successful authentication of user 110's identity.

In other instances, second IoT device 102B may inherit the prior authentication of user 110, as determined by provisioning system 130 during the provisioning of first IoT device 102A, and may perform operations consistent with the one or more provisioned services (e.g., the first payment service) without any additional re-authentication of user 110's identity. For example, and as described above, provisioning package 508 may not only include data identifying and specifying the one or more provisioned services, but may also include token 244, which confirms the prior authentication of user 110's identity. In some aspects, device provisioning module 308 may store the provisioned-service data and token 244 within one or more tangible, non-transitory memories, e.g., in service data 512 of provisioning data 308, and second IoT device 102B may rely on the prior authentication of user 110 to perform operations consistent with the one or more provisioned services, as described above.

In certain embodiments described above, device detection module 502 of first IoT device 102A may obtain data that uniquely identifies second IoT device 102B and that identifies one or more of the capabilities of second IoT device 102B, and device provisioning module 206 of first IoT device 102A may determine whether second IoT device 102B supports one or more of the services previously provisioned to first IoT device 102A. For example, when determining the ability of second IoT device 102B to support those services previously provisioned to first IoT device 102A, provisioning module 206 may determine that first IoT device 102A and second IoT device 102B both correspond to a common type of IoT device (e.g., the same model of LED-based smart light bulb), or alternatively, correspond to similar IoT devices having common and/or compatible functionalities (e.g., sensor functionalities, processing and storage functionalities, etc.).

In additional embodiments, and in response detected similarities and/or commonalities between first IoT device 102A and second IoT device 102B, device first IoT device 102A may perform operations that directly provision second IoT device 102B, e.g., without any interaction with provisioning system 130. For example, as illustrated in FIG. 5B, device provisioning module 206 may access stored data, e.g., service data 218, associated with one or more services previously provisioned to first IoT device 102A (e.g., by provisioning system 130, as described above), and based on the accessed data, determine that all or a portion of the previously provisioned services are available for subsequent provisioning to second IoT device 102B.

In certain aspects, device provisioning module 206 may generate a provisioning package 520 that identifies previously provisioned services supported by second IoT device 102B, and includes portions of service data 218 that enable second IoT device 102B to perform operations consistent with the previously provisioned services, such as elements of executable code and software instructions, service-specific cryptograms, etc. For example, the previously provisioned services may include the first payment service (e.g., which provisioning system 130 previously provisioned to first IoT device 102A), and provisioning package 520 may include executable applications and service-related cryptograms that facilitate a performance of operations consistent with the first payment service by second IoT device 102B. Additionally, in certain aspects, provisioning package 520 may also include token 244, which confirms the prior authentication of user 110, upon which provisioning system 130 relied when provisioning the first payment system to first IoT device 102A.

First IoT device 102A may, in some instances, transmit provisioning package 520 directly across network 122 to second IoT device 102B using any of the communications described above. Second IoT device 102B may receive provisioning package 120 from first IoT device 102A, and in some aspects, device provisioning module 306 may process provisioning package 520 and extract data associated with the one or more provisioned services (e.g., elements of executable code, one or more service-related cryptograms, etc.), which second IoT device 102B may store within one or more tangible, non-transitory memories, e.g., as service data 522 within provisioning data 308. In certain aspects, second IoT device 102B may access portions of the stored data, and a corresponding processing device of second IoT device 102B may execute portions of stored software instructions to perform operations consistent with the one or more provisioned services. For example, and as described above, second IoT device 102B may perform the operations consistent with the one or more provisioned services in response to a successful authentication of user 110's identity using any of the processes described above, or alternatively, second IoT device 102B may rely on a corresponding authentication token (e.g., token 244, which may be included within provisioning package 520) indicative of a prior authentication of user 110's identity by provisioning system 130.

Further, in certain embodiments, and in addition provisioning available services to comparable and compatible IoT devices upon registration onto communications network 120, first IoT device 102A may also be configured to identify functional incompatibilities of certain connected IoT devices, and perform operations that mediate these functional incompatibilities prior to provisioning these connected IoT devices with available services. By way of example, and as illustrated in FIG. 1, first IoT device 102A, second IoT device 102B, and third IoT device 102C may be registered onto network 122, and may establish a wireless mesh network that facilitates both communications with hub device 104 and directed machine-to-machine communications between the IoT devices.

In one instance, first IoT device 102A may represent a new model of a LED-based, smart light bulb, which may be fully provisioned with one or more available services using any of the exemplary processes described above. Further, second IoT device 102B and third IoT device 102C of FIG. 1 may also correspond to LED-based, smart light bulbs, but may represent older, less functional models sharing a common manufacturer with the smart light bulb of first IoT device 102A. For instance, second IoT device 102B and/or third IoT device 102C may be associated with outdated operating systems or outdated drivers, or may exchange data across network 122 (e.g., with hub device 104 and/or first IoT device 102A) using outdated communications protocols. Thus, in certain instances, certain services provisioned to first IoT device 102A may be incompatible with software executed by second IoT device 102B and/or third IoT device 102C, and additionally or alternatively, may be incompatible with one or more of the sensor, processing and storage, or communications functionalities of second IoT device 102B and/or third IoT device 102C.

In certain aspects, and prior to performing any of the exemplary processes described above to provision second IoT device 102B and/or third IoT device 102C with available services, first IoT device 102A may identify one or more limitations or inconsistencies associated with operating systems, drivers, and other software executed by second IoT device 102B and/or third IoT device 102C, and may obtain updates and/or software patches associated with the operating systems, drivers, and/or other software (e.g., from provisioning system 130 using the processes described above or from a computer system maintained by a third party, such as a manufacturer of the LED-based smart light bulbs). First IoT device 102A may, in some instances, transmit the data supporting the updates and/or software patches to second IoT device 102B and/or third IoT device 102C, which process and install the updates and/or software patches to render the corresponding operating systems, drivers, and other software compatible with the services available for provisioning by first IoT device 102A. In additional aspects, first IoT device 102A may receive the updates and/or the software patches at regular intervals, and by pushing these updates and/or software patches to second IoT device 102B and/or third IoT device 102C, first IoT device 102A may ensure the forward compatibility of second IoT device 102B and/or third IoT device 102C with its provisioned services.

In other aspects, certain software executed by second IoT device 102B and/or third IoT device 102C may no longer be support the services available for provisioning by first IoT device 102A, and may be sufficiently outdated as to render ineffective any available update or software patch. For example, a payment service provisioned to first IoT device 102A may no longer support a communications protocol utilized by third IoT device 102C when communicating with hub device 104, and the limited communications functionality of third IoT device 102C may not support a necessary software upgrade. In some instances, and to maintain the functionality of third IoT device 102C with the established mesh network, first IoT device 102A may perform operations that receive data transmitted from third IoT device 102C to hub device 104 in accordance with the outdated communications protocol, modify portions of the transmitted data to conform with one or more communications protocols that are compatible with the payment service, and relay the modified data to hub device 104 using any of the processes described above.

Figure 6:
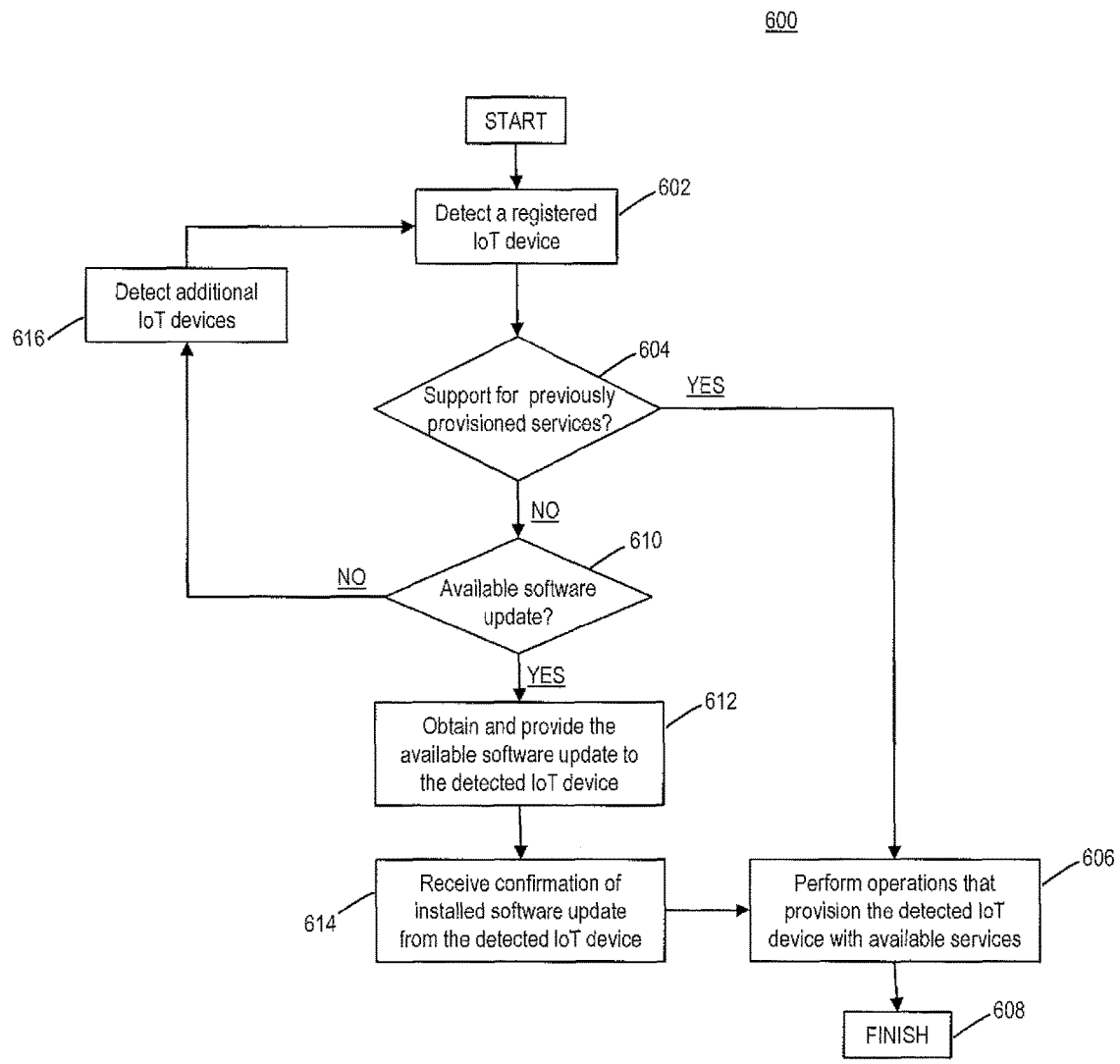
FIG. 6 is a flowchart of an exemplary process for automatically provisioning services to an IoT device, consistent with disclosed embodiments.

FIG. 6 is a flowchart of an example process 600 for automatically provisioning a connected, Internet-of-Things (IoT) device with one or more available services, in accordance with the disclosed embodiments For example, and using any of the exemplary processes described above, a first connected IoT device, such as first IoT device 102A, may be registered onto a corresponding communications network, e.g., network 122, and may be provisioned with one or more available services by a corresponding provisioning system, e.g., provisioning system 130. In certain aspects, first IoT device 102A may be configured to perform one or more steps of exemplary process 600, which provision one or more services previously provisioned to first IoT device 102 to an additional connected IoT device, e.g., second IoT device 102B, upon connection to and registration onto as network 122.

By way of example, an owner of first IoT device 102A, e.g., user 110, may obtain second IoT device 102B and connect second IoT device 102B to an available source of electrical energy. Upon connection to the available source of electrical energy, second IoT device 102B and hub device 104 may perform any of the exemplary operations described above to verify an identity of second IoT device 102B and to register second IoT device 102B onto network 122, e.g., by storing data that uniquely identifies second IoT device 102B and/or one or more functionalities of second IoT device 102B within a corresponding device registry. In response to the successful registration process, second IoT device 102B may establish communications with hub device 104 and additionally or alternatively, may communicate directly with first IoT device 102, across network 122, which may represent a wireless mesh network.

In some aspects, first IoT device 102A may detect an existence of second IoT device 102B, e.g., by detecting data broadcasted by second IoT device 102B across network 122 (e.g., in step 602). For instance, first IoT device 102A may receive, from second IoT device 102B across network 122, data that uniquely identifies second IoT device 102B, such as a device serial number, and additionally or alternatively, that identifies one or more of the capabilities of second IoT device 102B, such as sensor, communications, storage, and/or processing functionalities.

Based on portions of the obtained data, first IoT device 102A may determine whether second IoT device 102B supports one or more of the services previously provisioned to first IoT device 102A (e.g., in step 604). By way of example, first IoT device 102A may access stored data identifying and characterizing the previously provisioned services, and may determine sensor, storage, processing, interface, and/or communications capabilities associated with operations that implement these previously provisioned services. In certain aspects, and as described above, first IoT device 102A may determine in step 604 whether the sensor, storage, processing, interface and/or communications capabilities of second IoT device 102B are consistent with the corresponding sensor, storage, processing, interface, and/or communications associated with and required by the services previously provisioned to first IoT device 102A.

If first IoT device 102A were to determine that the capabilities of second IoT device 102B are consistent with those associated with the services previously provisioned to first IoT device 102A (e.g., in step 604; YES), first IoT device 102A may perform operations, either directly or in conjunction with provisioning system 130, that provision second IoT device 102B with one or more of the services that were previously provisioned to first IoT device 102 (e.g., in step 606).

In some aspects, in step 606, first IoT device 102A may generate a provisioning request that includes data identifying the one or more services previously provisioned to first IoT device 102A, data identifying second IoT device 102B, and further, data confirming the support of second IoT device 102 for the previously provisioned services. In some aspects, first IoT device 102A may transmit the provisioning request to hub device 104 across network 122, and as described above, hub device 104 may modify a portion of the provisioning request to include a unique identifier of hub device 104 (e.g., an IP address of hub device 104), and forward the modified provisioning request to provisioning system 130 across communications network 124.

Provisioning system 130 may, receive the provisioning request from first IoT device 102A (e.g., via hub device 104 across communications network 124), and using any of the exemplary processes described above, may generate a provisioning package that includes data specifying the one or more services previously provisioned to first IoT device 102A, which are similarly supported by second IoT device 102B. In certain aspects, the provisioning package may identify the previously provisioned services supported by second IoT device 102B, and may include data that enables second IoT device 102B to perform operations consistent with the previously provisioned services, such as elements of executable code (e.g., executable applications, widgets, plug-ins, etc.), service-related cryptograms, and other service-related data.

Additionally, in certain aspects, the provisioning package may also include authentication data (e.g., token 244) that confirms a prior authentication of user 110, upon which provisioning system 130 relied when provisioning the one or more to first IoT device 102A. As described above, provisioning system 130 may transmit the generated provisioning package to second IoT device 102B, e.g., through hub device 104, which may store data identifying and specifying the newly provisioned services in association with the unique device identifier of second IoT device 102B.

In other embodiments, first IoT device 102A may perform operations in step 606 that directly provision second IoT device 102B with one or more of the previously provisioned services. For example, when establishing the capability of second IoT device 102B to support the services previously provisioned to first IoT device 102A (e.g., in step 604), first IoT device 102A may establish that first IoT device 102A and second IoT device 102B represent a common IoT device (e.g., a single type of LED-based smart light bulbs) or similar devices having compatible functionalities (e.g., different brands of LED-based smart light bulbs having comparable sensing, processing, storage, and/or communications functionalities).

In certain aspects, and based on the determined commonality or compatibility, first IoT device 102A may access stored data that enables second IoT device 102B to perform operations consistent with the one or more services previously provisioned to first IoT device 102A, such as elements of executable code (e.g., executable applications, widgets, plug-ins, etc.), service-related cryptograms, and/or other service-related data (e.g., in step 606). Further, in step 606, first IoT device 102A may also generate a corresponding provisioning package that identifies the one or more services previously provisioned to first IoT device 102A and includes portions of the obtained data that enable second IoT device 102B to perform operations consistent with the previously provisioned services. In certain aspects, first IoT device 102A may transmit the generated provisioning package directly across network 122 to second IoT device 102B using any of the communications protocols outlined above, e.g., through various machine-to-machine communications protocols.

Second IoT device 102B may receive the provisioning package (e.g., directly from first IoT device 102A or from provisioning system 130 via hub device 104). In some aspects, and upon receipt of the provisioning package to second IoT device 102B, exemplary process 600 may be complete (e.g., in step 608). As described above, second IoT device 102B may receive the transmitted provisioning package, and using any of the exemplary processes described above, may store portions of the transmitted provisioning package within locally accessible, tangible, non-transitory memories and perform operations consistent with the one or more provisioned services in response to a successful authentication of user 110, or alternatively, in reliance on a prior successful authentication of user 110.

Referring back to step 604, if first IoT device 102A were to determine that the sensor, storage, processing, interface, and/or communications capabilities of second IoT device 102B are inconsistent with those associated with or required by the services previously provisioned to first IoT device 102A (e.g., in step 604; NO), first IoT device 102A may perform additional operations that determine whether an available update to software executed by second IoT device 102B would render the capabilities of second IoT device 102B consistent with those associated with or required by the previously provisioned services (e.g., in step 610). For example, in step 610, first IoT device 102A may establish that an operating system executed by second IoT device 102B is outdated, that the outdated operating system renders a communications functionality of second IoT device 102B incompatible with one or more of the services previously provisioned to first IoT device 102A, and further, that an update to that operating system is currently available (e.g., based on data exchanged between first IoT device 10A and a computing system maintained by a developer of the operating system).

In one aspect, first IoT device 101A may determine that the available software update may render the sensor, storage, processing, interface, and/or communications capabilities of second IoT device 102B consistent with those of the previously provisioned services (e.g., step 610; YES), and first IoT device may obtain data associated with the available software update (e.g., elements of executable code, patches, etc.) from provisioning system 130 and/or one more third-party computing systems (e.g., as maintained by a developer of software update) and provide the obtained data to second IoT device 102B (e.g., in step 612). Second IoT device 102B may receive and process the transmitted data to install the available update and render second IoT device 102B compatible with the one or more services previously provisioned to first IoT device 102A. In certain aspects, first IoT device 102A may receive a confirmation of the installation of the available software update from second IoT device 102B (e.g., in step 614), and exemplary process 600 may pass pack to step 606, and first IoT device 102A may perform any of the exemplary processes described above to provision second IoT device 102B with the services previously provisioned to first IoT device 102A.

If, however, first IoT device 102A were to determine that no software update is available, or that the available software update would not render the sensor, storage, processing, and/or communications capabilities of second IoT device 102B consistent with those of the previously provisioned services (e.g., step 610; NO), first IoT device 102A may perform operations that detect additional connected IoT devices broadcasting data across network 122 (e.g., in step 616). In certain instances, and upon detection of the additional IoT devices, first IoT device 102A hub device 104 may perform any of the exemplary processes described above to determine whether these additional IoT devices support one or more of the services previously provisioned to first IoT device 102A, and if so, to provision these additional IoT devices with the one or more previously provisioned services.

IV. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including device activation modules 204 and 304, device provisioning modules 206 and 306, detection and registration module 222, hub provisioning module 226, relay module 227, authentication module 232, provisioning module 236, and device detection module 502, can be implemented as one or more computer programs, i.e., one or more modules of computer program instructions encoded on a tangible non-transitory program carrier for execution by, or to control the operation of, data processing apparatus. Additionally or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, such as an FPGA (field programmable gate array) or an ASIC (application-specific integrated circuit). The apparatus can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup, language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A device, comprising:
   a communications device;
   a storage unit storing instructions; and
   at least one hardware processor being coupled to the communications device and the storage unit and configured to execute the instructions to:
   establish a connection with a communications network using the communications device;
   receive, from a computing system, first data specifying a plurality of first services available to the device, the device having a corresponding first device type, the first services being consistent with the first device type, and the first data being indicative of an authentication of the device;
   store the first data within a portion of the storage unit, the storage of the first data provisioning the device with the available first services;
   detect an additional device connected to the communications network, the additional device having a corresponding second device type;
   in response to the detection, identify a subset of the first services that is consistent with the second device type; and
   transmit a portion of the stored first data that specifies the subset of the first services to the additional device across the communications network, the additional device being configured to process the portion of the stored first data to provision the additional device with the subset of the first services prior to an authentication of the additional device.

2. The device of claim 1, wherein the at least one hardware processor is further configured to:
   obtain second data associated with plurality of second services available, the second data comprising identifiers of the second services and device types associated with the second devices;
   determine that the device types of a subset of the second services are consistent with the second device type; and
   transmit the identifiers of the subset of the second services to the computing system.

3. The device of claim 2, wherein, in response to the transmitted identifiers, the computing system is configured to transmit data specifying the subset of the second services to the additional device prior to the authentication of the additional device, the transmitted data provisioning the additional device with the subset of the second services.

4. The device of claim 1, wherein the at least one hardware processor is further configured to:
   establish a device capability of the additional device, the device capability being associated with the second device type; and
   determine that the established device capability is inconsistent with a service capability associated with a corresponding one of the first services.

5. The device of claim 4, wherein the at least one hardware processor is further configured to:
   obtain code executable by the additional device, the obtained code corresponding to one of an executable application and a device driver; and
   in response to the determination, transmit the obtained code to the additional device, the additional device being configured to execute the code to modify the device capability in a manner consistent with the service capability.

6. The device of claim 4, wherein the at least one hardware processor is further configured to:
   receive second data structured in accordance with the service capability of the corresponding first service;
   in response to the determination, modify a portion of the second data to reflect the established device capability; and
   transmit the modified portion of the second data to the additional device.

7. The device of claim 1, wherein the device comprises one of a smart appliance, a sensor device, and a component of a vehicle.

8. The device of claim 1, wherein the subset of the available services comprises a payment service associated with the computing system.

9. The device of claim 8, wherein:
the second data comprises authentication data, the authentication data confirming the authentication of the device; and
the additional device inherits the device authentication; and
the additional device is configured to implement the payment service in accordance with the inherited device authentication.

10. The device of claim 1, wherein:
the subset of the available services comprises a configuration service;
the second data comprises configuration data associated with the device, the configuration data identifying a user-specified value of a configurable device parameter; and
upon provisioning to the additional device, the configuration service causes the additional device to configure the configurable device parameter in accordance with the user-specified value.

11. A computer-implemented method, comprising:
establishing, by at least one hardware processor, a connection with a communications network;
receiving, by the at least one hardware processor, and from a computing system, first data specifying a plurality of first services associated with the device, the device having a corresponding first device type, the first services being consistent with the first device type, and the first data being indicative of an authentication of the device;
performing, by the at least one hardware processor, operations that store the first data within a portion of a storage unit, the storage of the first data provisioning the device with the available first services;
detecting, by the at least one hardware processor, an additional device connected to the communications network, the additional device having a corresponding second device type;
in response to the detection, identifying, by the at least one hardware processor, a subset of the first services that are consistent with the second device type; and
transmitting, by the at least one hardware processor, a portion of the stored first data that specifies the subset of the first services to the additional device across the network, the additional device being configured to process the portion of the stored first data to provision the additional device with the subset of the first services prior to an authentication of the additional device.

12. An apparatus, comprising:
a communications device;
a storage unit storing instructions; and
at least one hardware processor coupled to the communications device and the storage unit and configured to execute the instructions to:
establish a communications session with a first device across a network, the first device being associated with a first device type;
obtain first data identifying a plurality of first services that are provisioned to the first device by a computing system, the first data being indicative of an authentication of the device;
detect a second device connected to the communications network, the second device having a corresponding second device type;
determine that a subset of the first services is consistent with the second device type; and
transmit second data identifying the subset of the first services to the computing system, the computing system being configured to provide, to the second device, service data that provisions the second device with the subset of the first services prior to an authentication of the second device.

13. The apparatus of claim 12, wherein the at least one hardware processor is further configured to, in response to the established communications session, store an identifier of the first device and the first device type in a portion of the storage unit, the storage of the first device identifier and the first device type registering the first device onto the network.

14. The apparatus of claim 12, wherein the at least one hardware processor is further configured to:
in response to the detection, establish a communications session with the second device across the network; and
store an identifier of the second device and the second device type in a portion of the storage unit, the storage of the second device identifier and the second device type registering the first device onto the network.

15. The apparatus of claim 12, wherein the at least one hardware processor is further configured to:
obtain second data associated with a plurality of second services, the second data comprising identifiers of the second services and device types associated with the second devices;
determine that the device types of a subset of the second services is consistent with the second device type; and
transmit the identifiers of the subset of the second services to the computing system.

16. The apparatus of claim 15, wherein, in response to the transmitted identifiers, the computing system is configured to transmit additional service data specifying the subset of the second services to the second device prior to the authentication of the additional device, the transmitted additional service data provisioning the second device with the subset of the second services.

17. The apparatus of claim 12, wherein the first and second devices comprise one of a smart appliance, a sensor device, and a component of a vehicle.

18. The apparatus of claim 12, wherein the subset of the first services comprises a payment service associated with the computing system.

19. The apparatus of claim 12, wherein:
the second data comprises authentication data, the authentication data confirming the authentication of the device; and
the additional device inherits the device authentication; and
the additional device is configured to implement the payment service in accordance with the inherited authentication.

20. The apparatus of claim 12, wherein:
the subset of the first services comprises a configuration service;
the second data comprises configuration data associated with the device, the configuration data identifying a user-specified value of a configurable device parameter; and
upon provisioning to the additional device, the configuration service causes the additional device to configure the configurable device parameter in accordance with the user-specified value.

* * * * *